US012746540B2

(12) United States Patent
Gledhill et al.

(10) Patent No.: US 12,746,540 B2
(45) Date of Patent: Sep. 29, 2026

(54) PIPETTING HEAD FOR A LIQUID DISPENSING APPARATUS FOR USE WITH AN ARRAY OF PIPETTES

(71) Applicant: SPT LABTECH LTD., Hertfordshire (GB)

(72) Inventors: David Gledhill, Cambridgeshire (GB); Reuben Pardoe, Cambridgeshire (GB); Robert Lewis, Cambridgeshire (GB); David Cochrane, Bedfordshire (GB)

(73) Assignee: SPT LABTECH LTD., Hertfordshire (GB)

( * ) Notice: Subject to any disclaimer, the term of this patent is extended or adjusted under 35 U.S.C. 154(b) by 364 days.

(21) Appl. No.: 18/567,793

(22) PCT Filed: Jun. 10, 2022

(86) PCT No.: PCT/GB2022/051472
§ 371 (c)(1),
(2) Date: Dec. 7, 2023

(87) PCT Pub. No.: WO2022/258995
PCT Pub. Date: Dec. 15, 2022

(65) Prior Publication Data
US 2024/0269664 A1 Aug. 15, 2024

(30) Foreign Application Priority Data
Jun. 11, 2021 (GB) .................................... 2108407

(51) Int. Cl.
*G01N 35/10* (2006.01)
*B01L 3/02* (2006.01)
(Continued)

(52) U.S. Cl.
CPC .......... *B01L 3/0227* (2013.01); *B01L 3/0275* (2013.01); *B01L 9/50* (2013.01); *B01L 2200/02* (2013.01); *B01L 2300/10* (2013.01)

(58) Field of Classification Search
CPC ........ B01L 3/0227; B01L 3/0275; B01L 9/50; B01L 2200/02; B01L 2300/10;
(Continued)

(56) References Cited

U.S. PATENT DOCUMENTS 4,474,071 A 10/1984 Autry
5,192,511 A 3/1993 Roach
(Continued)

FOREIGN PATENT DOCUMENTS

EP 3075839 A1 10/2016
EP 3330366 A1 6/2018
(Continued)

*Primary Examiner* — Brandi N Hopkins
(74) *Attorney, Agent, or Firm* — Dickinson Wright PLLC

(57) ABSTRACT

A pipetting head for a liquid dispensing apparatus has a pipette tip connection mechanism and a plunger clamping mechanism having a plurality of mounts for holding the plungers of the array of pipettes during use, a plurality of clamping rods, each extending inside one of the mounts, and a clamping drive mechanism operable to drive relative movement between the mounts and the clamping rods to selectively engage the clamping mechanism. The mounts each have a radially extending feature configured to form one half of a snap-fit connection. The clamping region of each of the clamping rods is axially adjacent to the radially extending feature of its associated mount when in a clamping position, and is axially offset from the radially extending feature of its associated mount when in the release position. The clamping rod prevents the snap-fit connection with the plunger from being released when in the clamping position.

20 Claims, 22 Drawing Sheets

(51) Int. Cl.
*B01L 9/00* (2006.01)
*G01F 11/02* (2006.01)

(58) Field of Classification Search
CPC .... B01L 3/0217; B01L 3/0279; B01L 3/0224; B01L 3/021; B01L 3/02; B01L 3/022; B01L 3/00; B01L 9/543; B01L 3/0237; B01L 2200/689; B01L 9/54; B01L 3/0268; B01L 3/0234; B01L 3/563; B01L 3/0206; B01L 3/5085; B01L 3/0282; B01L 3/0286; G01N 35/1011; G01N 35/10; G01N 35/1074; G01N 35/1067; G01N 35/0099; G01N 35/028; G01N 35/1009; G01N 35/1065; G01N 35/1095; G01N 1/00; C12M 29/04; B01F 23/232; B25J 15/0047; Y02A 50/30; A61M 5/31501
See application file for complete search history.

(56) References Cited

U.S. PATENT DOCUMENTS

| | | | | |
|---|---|---|---|---|
| 8,029,742 | B2 * | 10/2011 | Butz ..................... | B01L 3/0217<br>422/501 |
| 2020/0215528 | A1 | 7/2020 | Seippel et al. | |

FOREIGN PATENT DOCUMENTS

| | | | |
|---|---|---|---|
| EP | 3939702 | A1 | 1/2022 |
| WO | 2005082536 | A1 | 9/2005 |
| WO | 2015193957 | A1 | 12/2015 |
| WO | 2020159658 | A1 | 8/2020 |
| WO | 2020159659 | A1 | 8/2020 |

* cited by examiner

PIPETTING HEAD FOR A LIQUID DISPENSING APPARATUS FOR USE WITH AN ARRAY OF PIPETTES

CROSS-REFERENCE TO RELATED APPLICATIONS

This application is a U.S. National Stage of International Application No. PCT/GB2022/051472, filed on Jun. 10, 2022, which claims the benefit and priority of GB Patent Application No. 2108407.4, filed on Jun. 11, 2021, the entire contents of which are incorporated herein by reference.

FIELD OF THE INVENTION

The present invention relates to a pipetting head for a liquid dispensing apparatus, in particular to a pipetting head having a pipette tip connection mechanism and a plunger connection mechanism by which a pipette with a pipette tip and a plunger can be securely mounted to the pipetting head.

BACKGROUND OF THE INVENTION

It is known to use a pipette to aspirate or dispense a liquid sample.

It is also known to use a pipette having a plunger disposed in a pipette tip. A typical pipette, known as a "positive displacement" pipette, uses a plunger or piston to aspirate or dispense liquid either through direct contact with the sample liquid or via a small air gap. During use, the pipette tip and plunger are mounted on a pipetting head of a liquid dispensing apparatus, which drives the plunger relative to the tip to aspirate or dispense liquid from an aperture at the distal end of the pipette tip. Such pipettes can be used in automated machines to improve accuracy and repeatability of pipetting actions The inventors have identified several problems with the manner in which pipettes are connected with known pipetting heads for liquid dispensing apparatuses.

There is a need for an improved pipetting head.

SUMMARY OF THE INVENTION

A first aspect of the invention provides a pipetting head for a liquid dispensing apparatus for use with an array of pipettes each having a pipette tip and a plunger disposed within the pipette tip, the pipetting head comprising: a pipette tip connection mechanism with a plurality of tip mounts for holding the pipette tips of the array of pipettes during use; and a plunger connection mechanism with a plurality of plunger mounts for holding the plungers of the array of pipettes during use, wherein each of the plurality of tip mounts comprises a radially extending feature on its outer surface which is configured to form one half of a snap-fit connection, and wherein the pipette tip connection mechanism is a pipette tip clamping mechanism further comprising: a plurality of tip clamping members each associated with one of the plurality of tip mounts and each having a clamping region, and a tip clamping drive mechanism comprising an actuator operable to drive relative movement between the tip mounts and the tip clamping members in an axial direction to selectively engage the pipette tip clamping mechanism by moving it between a clamp position and a release position, wherein the clamping region of each tip clamping member is axially adjacent to the radially extending feature on the outer surface of its associated tip mount when the pipette tip clamping mechanism is in the clamp position, and wherein the clamping region of each tip clamping member is axially offset from the radially extending feature on the outer surface of its associated tip mount when the pipette tip clamping mechanism is in the release position. Alternatively, or in addition, each of the plurality of plunger mounts has a radially extending feature on its inner surface which is configured to form one half of a snap-fit connection, wherein the plunger connection mechanism is a plunger clamping mechanism further comprising: a plurality of plunger clamping members each associated with one of the plurality of plunger mounts and each having a clamping region, and a plunger clamping drive mechanism comprising an actuator operable to drive relative movement between the plunger mounts and the plunger clamping members in an axial direction to selectively engage the plunger clamping mechanism by moving it between a clamp position and a release position, wherein the clamping region of each plunger clamping member is axially adjacent to the radially extending feature on the inner surface of its associated plunger mount when the plunger clamping mechanism is in the clamp position, and wherein the clamping region of each plunger clamping member is axially offset from the radially extending feature on the inner surface of its associated plunger mount when the plunger clamping mechanism is in the release position.

This provides an extremely compact arrangement with which a large number of pipettes can be accurately and securely mounted to the pipetting head. This is of particular benefit in liquid dispensing apparatuses intended for use with standard 384 well plates, since the compact arrangement can allow 384 mounting collars and locking members to be provided to hold 384 pipettes in a 16×24 matrix. This enables liquid to be aspirated from or dispensed into a conventional 384 well plate in a single action. As used herein, the terms "clamping" and "clamp" refer to arrangements by which the pipette tip or plunger is both mounted and locked in place to prevent inadvertent removal. This is in contrast to arrangements in which the pipette tip or plunger are mounted without locking, for example using an interference fit or a snap-fit connection in which the pipette tip or plunger can be removed simply by pulling in an axial direction. The clamping arrangements can also improve the accuracy of aspirating and dispensing operations by preventing small relative movements that might otherwise occur between the pipetting head and the plunger or the pipette tip.

Furthermore, by configuring the tip connection mechanism as a tip clamping mechanism, and/or configuring the plunger connection mechanism as a plunger clamping mechanism, in which a clamping member is moveable into and out of register with a snap-fit feature on a mount, the pipette tip and/or the plunger can be clamped in position on the mount simply by limiting deflection of the connector portion of the tip or plunger to prevent the snap-fit connection with the mount from being disengaged. This can enable the pipette tip and/or the plunger from being mounted and securely clamped in place without the need to exert any significant forces on the tip connector portion of the pipette tip and/or the plunger connector portion of the plunger. This can reduce the force required to engage the pipette tip clamping mechanism and/or the plunger clamping mechanism. This is in contrast to some known tip connection mechanisms in which clamping is achieved by expanding a collet within the pipette tip to press outwardly against the upper end of the pipette tip and thereby exerting hoop stresses in the pipette tip. It is also in contrast to some known plunger connection mechanisms in which clamping is achieved by compressing a collet against the outer surface of the upper end of the plunger and exerting compressive stresses on the plunger.

The plurality of tip clamping members may each comprise any suitable component by which radial movement of a pipette tip on its associated tip mount can be restricted when the pipette tip clamping mechanism is in the clamp position.

The plurality of tip clamping members may comprise a plurality of sleeves each defining a clamping region. The sleeves may be axially aligned with the plurality of tip mounts. The sleeves may be coaxial with the plurality of tip mounts. The sleeves may be discontinuous or continuous. The sleeves may circumscribe the plurality of tip mounts when the pipette tip clamping mechanism is in the clamp position. The sleeves may have a substantially constant inner diameter. The sleeves may have regions in which the inner diameter is different.

The pipette tip clamping mechanism may comprise a pipette tip clamping plate on which the plurality of tip clamping members is provided. The pipette tip clamping plate may be moveable in the axial direction relative to the plurality of pipette tip mounts to selectively engage the pipette tip clamping mechanism.

The plurality of sleeves may be defined by one or more discrete components secured to the pipette tip clamping plate. The plurality of sleeves may be defined by apertures defined in the pipette tip clamping plate.

The radially extending feature on the outer surface of each of the plurality of tip mounts may have any suitable shape. The radially extending feature on the outer surface of one or more of the plurality of tip mounts may be a recess or groove. This arrangement is particularly suited for use with pipette tips having correspondingly shaped protrusions configured for receipt in the grooves. The radially extending feature on the outer surface of each of the plurality of tip mounts may be a circumferential groove. The circumferential groove may comprise circumferential discontinuities. For example, the circumferential groove may be part-annular.

In other embodiments, the radially extending feature on the outer surface of one or more of the plurality of tip mounts may be a protrusion. This arrangement is particularly suited for use with pipette tips having correspondingly shaped recesses or grooves configured to receive the protrusions on the tip mounts.

The plurality of plunger mounts may comprise a plurality of axially extending sleeves. The plurality of plunger clamping members may comprise a plurality of axially extending clamping rods each defining a clamping region. The clamping rods may extend inside the plurality of axially extending sleeves when the plunger clamping mechanism is engaged. The sleeves may have a substantially constant inner diameter. Alternatively, the sleeves may have regions in which the inner diameter is different. The plurality of axially extending sleeves may each comprise a plurality of axial slots at their distal ends. This can help to allow compliance between the channels defined by the pipetting head and the array of pipettes mounted to the pipetting head.

The plurality of clamping rods may each have an enlarged distal end portion connected to a narrower shaft portion, the enlarged distal end portion defining the clamping region. With this arrangement, the clamping mechanism can be moved to a release position from the clamp position by moving the plurality of clamping rods in either axial direction. This can facilitate removal of both the plunger and pipette tip of a pipette by moving the clamping rods downwards both to disengage the clamping mechanism and to push the plunger and pipette tip from their respective mounts.

According to a second aspect of the invention, there is provided a pipette for use with the pipetting head according to the first aspect of the invention, comprising: a pipette tip having a distal end with a dispensing aperture and a proximal end with a tip connector portion for connecting the pipette tip to the pipette tip connection mechanism of the pipetting head during use; and a plunger having a distal end positioned inside the pipette tip and a proximal end with a hollow plunger connector portion for connecting the plunger to the plunger connection mechanism of the pipetting head during use. The tip connector portion has a radially extending feature on its inner surface configured to form a snap-fit connection with the radially extending feature on the outer surface of one of the plurality of pipette tip mounts, the tip connector portion being configured to resiliently deflect in a radially outward direction from a rest position, in which the tip connector portion has a first outer diameter, to an expanded position, in which the tip connector portion has a second outer diameter which is larger than the first outer diameter by at least the radial extent of the radially extending feature of the tip connector portion. Alternatively, or in addition, the plunger connector portion has a radially extending feature on its outer surface configured to form a snap-fit connection with the radially extending feature on the inner surface of one of the plurality of plunger mounts, the plunger connector portion being configured to resiliently deflect in a radially inward direction from a rest position, in which the plunger connector portion has a first inner diameter, to a compressed position, in which the plunger connector portion has a second inner diameter which is smaller than the first inner diameter by at least the radial extent of the radially extending feature of the plunger connector portion.

The tip connector portion may comprise a split tubular wall defined by a plurality of flexible segments configured to resiliently deflect in the radially outward direction to deflect the tip connector portion from the rest position to the expanded position. The flexible segments may be defined by a series of axially extending discontinuities or slots in the tubular wall. The axially extending discontinuities may be equidistantly spaced about the longitudinal axis of the pipette. The axially extending discontinuities may have the same or different axial lengths. The axially extending discontinuities may be aligned with the pipette axis or at an angle to the pipette axis.

The radially extending feature on the inner surface of the tip connector portion may comprise a protrusion or rib which protrudes radially inwardly from the inner surface of the tip connector portion. This arrangement is particularly suited for use with a tip mount having a correspondingly shaped recess or groove configured to receive the protrusion or rib of the tip connector portion. The protrusion or rib may be a circumferential rib. The circumferential rib may comprise circumferential discontinuities. For example, the circumferential rib may be part-annular.

Alternatively, or in addition, the radially extending feature on the inner surface of the tip connector portion may comprise a recess or groove which extends radially outwardly into the inner surface of the tip connector portion. This arrangement is particularly suited for use with a tip mount having a correspondingly shaped protrusion or rib configured for receipt in the recess or groove of the tip connector portion.

The plunger connector portion may comprise a split tubular wall defined by a plurality of flexible segments configured to resiliently deflect in a radially inward direction to deflect the plunger connector portion from the rest position to the compressed position. The flexible segments may be defined by a series of axially extending discontinuities or slots in the tubular wall. The axially extending discontinuities may be equidistantly spaced about the longitudinal axis of the pipette. The axially extending discontinuities may have the same or different axial lengths. The axially extending discontinuities may be aligned with the pipette axis or at an angle to the pipette axis.

The radially extending feature on the outer surface of the plunger connector portion may comprise a shaped head portion adjacent to a recess or groove which extends radially inwardly into the outer surface of the plunger connector portion. The recess or groove defines a lower portion of the shaped head. The shaped head may have substantially the same outer diameter as the region of the plunger connector portion immediately below the recess or groove. This arrangement is particularly suited for use with a plunger mount having a correspondingly shaped recess configured to receive the shaped head of the plunger connector portion.

The recess or groove of the plunger connector portion may be a circumferential groove. The circumferential groove may comprise circumferential discontinuities.

For example, the circumferential groove may be part-annular. The second inner diameter to which the plunger connector portion is decreased is smaller than the first inner diameter by at least the radial extent of the radially extending feature, i.e. by at least half the difference between the outer diameter of the shaped head and the outer diameter at the narrowest part of the annular recess immediately below it.

The clamping region of each of the plurality of sleeves of the tip clamping mechanism may have an inner diameter which is greater than or equal to the first outer diameter of the tip connector portion and is less than the second outer diameter of the tip connector portion such that the clamping region prevents the tip connector portion from deflecting to the expanded position and thereby releasing the snap-fit connection when the tip clamping mechanism is in the clamp position.

The clamping region of each of the plurality of axially extending clamping rods may have an outer diameter which is less than or equal to the first inner diameter of the plunger connector portion and is greater than the second inner diameter of the plunger connector portion such that the clamping region prevents the plunger connector portion from deflecting to the compressed position and thereby releasing the snap-fit connection when the plunger clamping mechanism is in the clamp position.

According to a third aspect of the invention, there is provided a liquid dispensing apparatus comprising: a body with a microplate receiving area; and a pipetting head according to the first aspect of the invention, the pipetting head being positioned above the microplate receiving area.

BRIEF DESCRIPTION OF THE DRAWINGS

Further features and advantages of the present invention will be further described below, by way of example only, with reference to the accompanying drawings in which.

DETAILED DESCRIPTION

Figure 1:
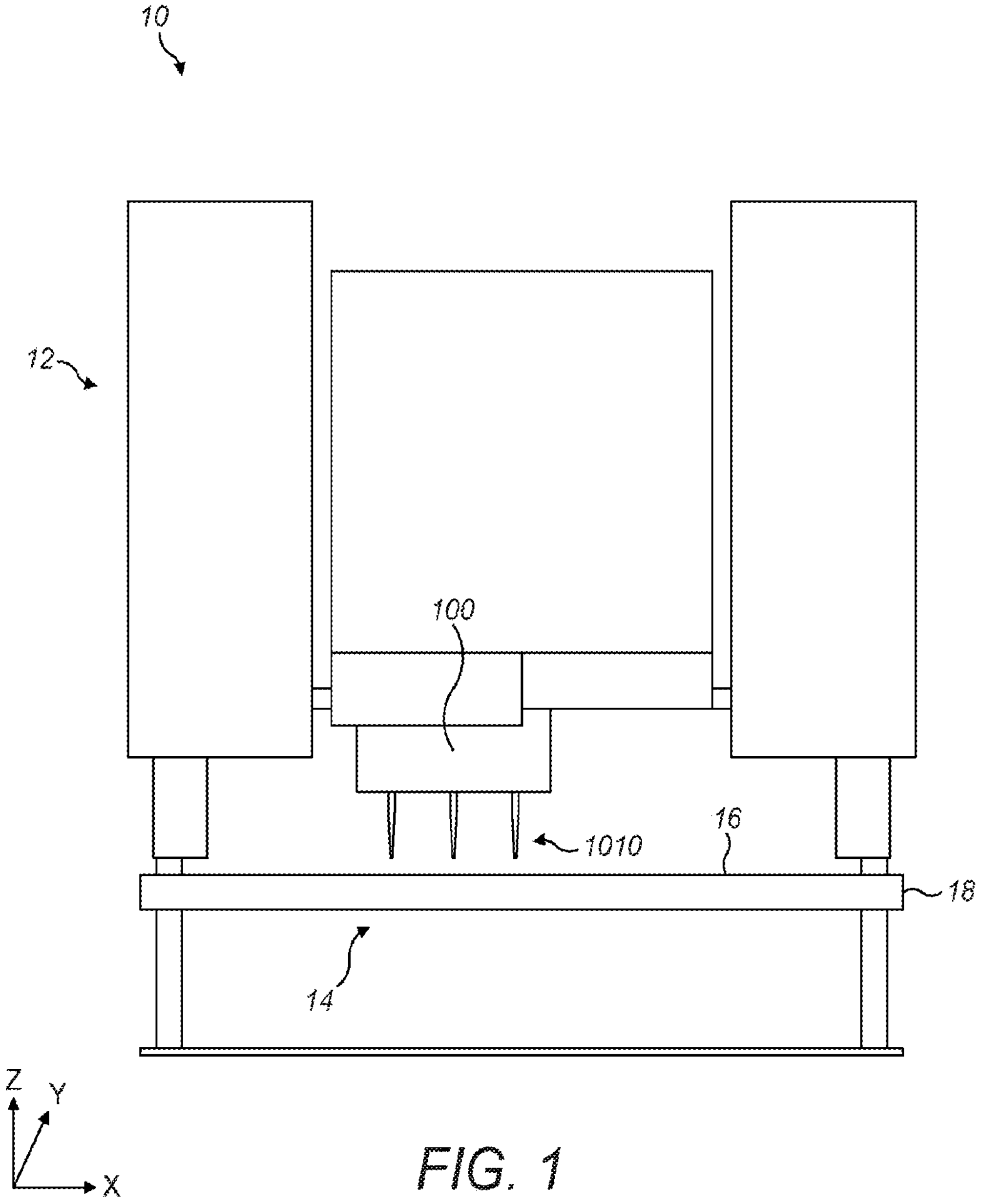
FIG. 1 is a perspective view of a liquid dispensing apparatus with a pipetting head in accordance with the present invention.

FIG. 1 shows a liquid dispensing apparatus 10 for use with an array of positive displacement pipettes 1010. The apparatus 10 comprises a body 12 with a microplate receiving area, or deck, 14 and a pipetting head 100 positioned above the microplate receiving area 14. The microplate receiving area 14 is has a substantially horizontal upper surface 16 arranged to receive a laboratory microplate. The receiving area 14 can be located on a height-adjustable support structure 18 which enables the height of the microplate receiving area 14 to be varied as required. The receiving area 14 may be configured to retain a laboratory microplate is a fixed position. For example, the upper surface 16 of the receiving area 14 may comprise one or more recesses (not shown) arranged to receive a microplate and to prevent lateral translation of the microplate with respect to the receiving area 14. The apparatus 10 will generally be used in the orientation shown in FIG. 1 to retain products in wells of the microplate by gravity. The axis marked Z in FIG. 1 therefore represents an upward direction, with gravity acting in the opposite direction to retain the products in the wells of the microplate. References to upward and downward directions or to an axial direction therefore refer to movement along the axis marked Z in FIG. 1, while references to lateral or transverse directions refer to movement in the directions marked X and Y in FIG. 1. References to vertical direction or height also therefore refer to dimensions or movement along the axis marked Z in FIG. 1. The pipetting head 100 is configured to hold an array of pipettes, as discussed below in relation to FIGS. 2 to 9, and may be moveable in relation to the deck 14 to bring pipettes mounted on the pipetting head 100 into close proximity to a microplate supported on the deck 14 to allow liquid to be aspirated from or dispensed into the wells of the microplate.

Figure 2:
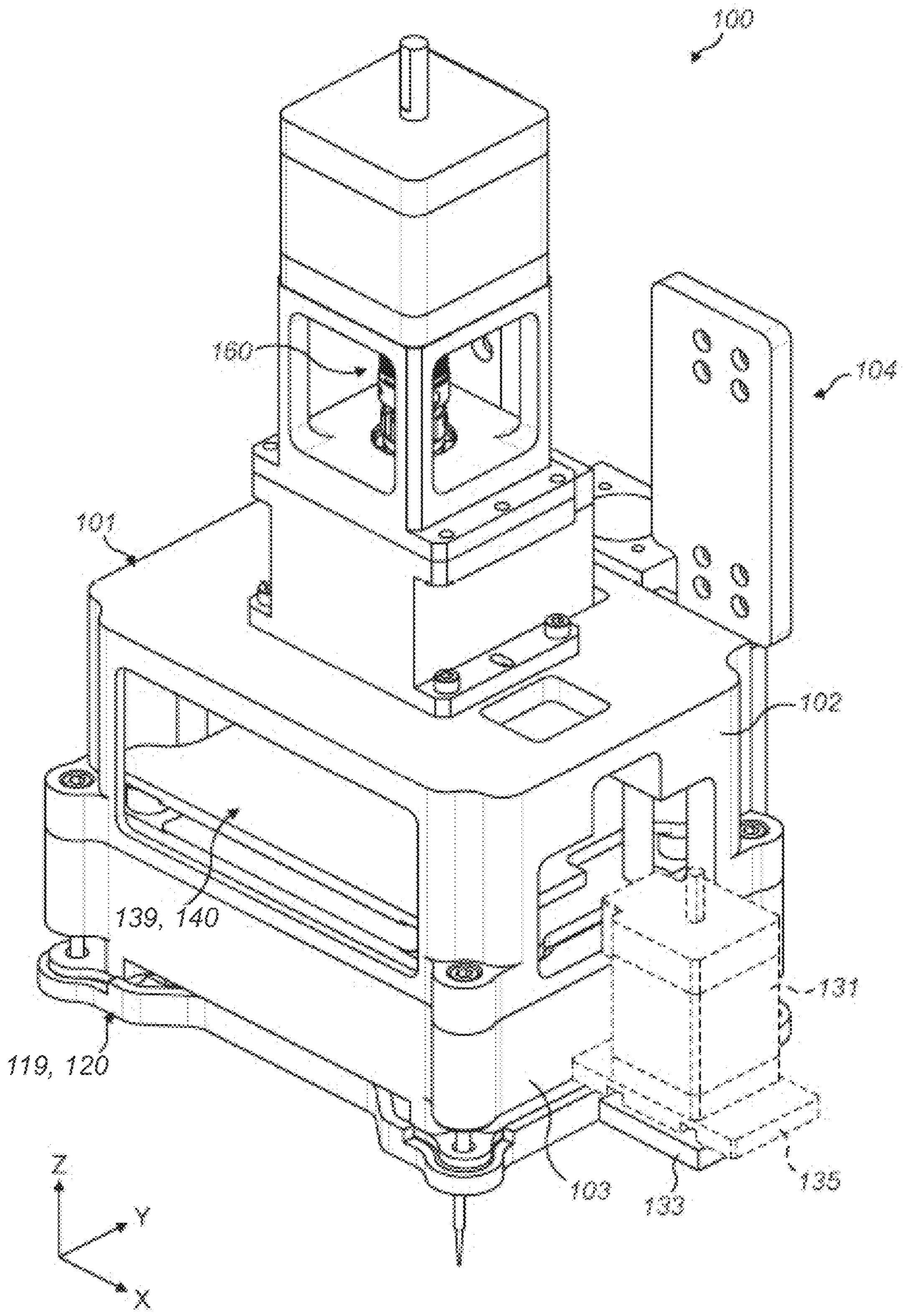
FIG. 2 is a perspective view of a pipetting head in accordance with the present invention.
Figure 3:
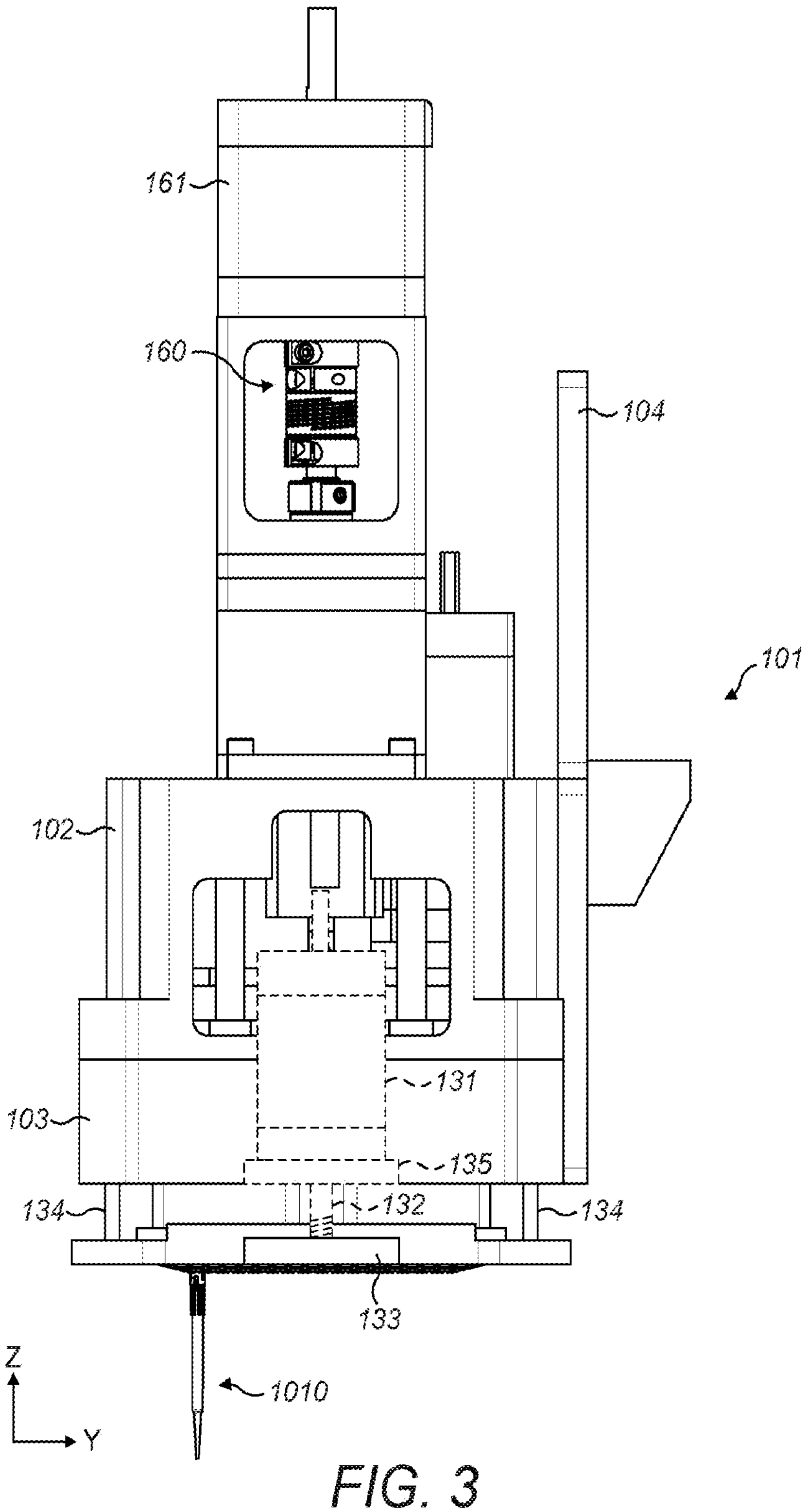
FIG. 3 is a side view of the pipetting head of FIG. 2.
Figure 4:
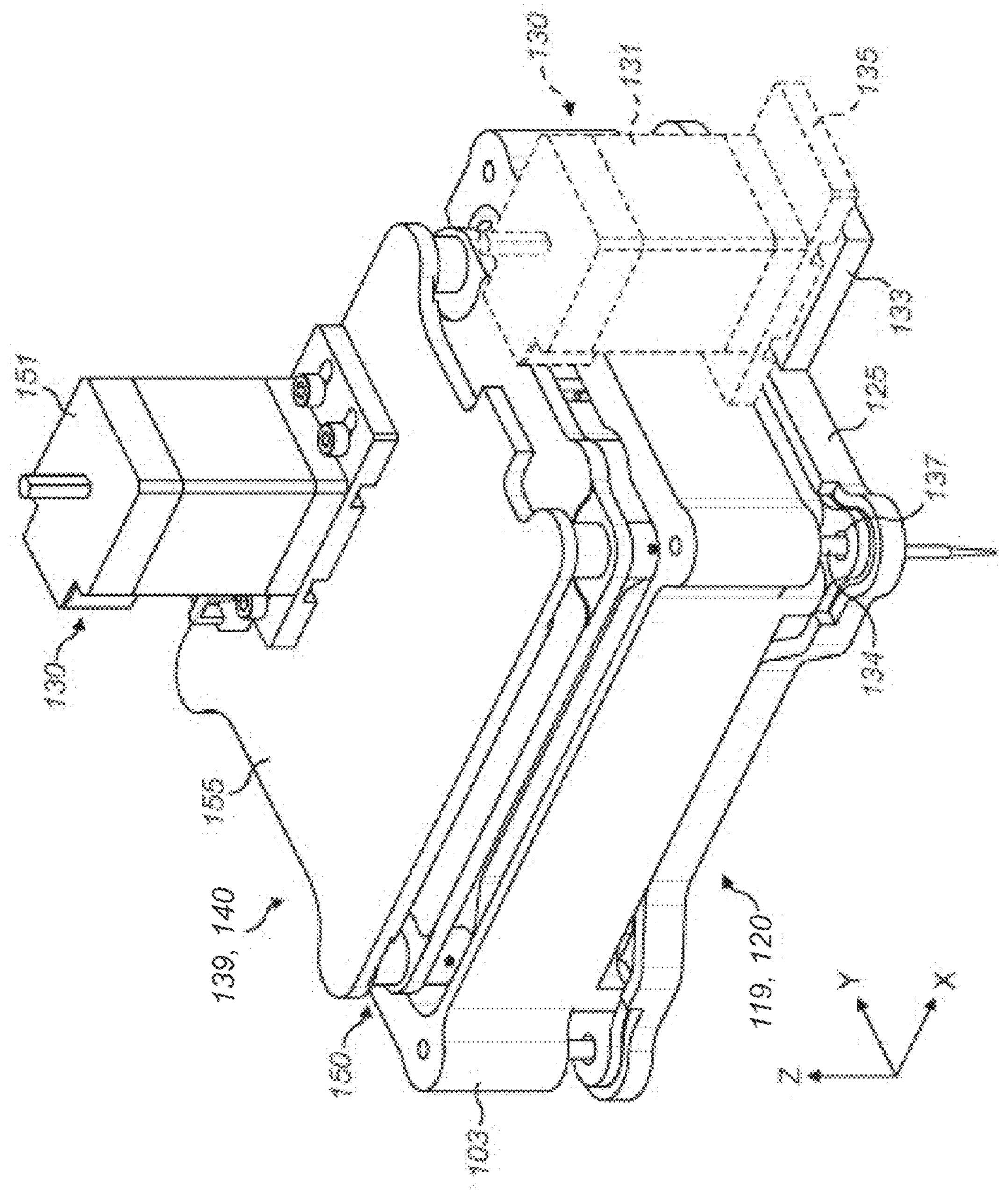
FIG. 4 is a perspective view of the pipetting head of FIG. 2, in which various components are omitted for clarity, and in which the pipette tip clamping mechanism and the plunger clamping mechanism are shown.

FIGS. 2 to 4 show the pipetting head 100 in more detail. The pipetting head comprises a head chassis 101 having an upper head chassis part 102 and a lower head chassis part 103 which are bolted together to form the main body of the pipetting head 100. The upper and lower head chassis parts are connected to the body of the apparatus by chassis support plates 104. The chassis support plates 104 preferably enable the entire pipetting head 100 to be moved in the X, Y and Z directions relative to the receiving area of the apparatus in a conventional manner using one or more head actuators (not shown). The pipetting head 100 further comprises a pipette tip connection mechanism 119 for coupling to the pipette tips of an array of positive displacement pipettes during use, and a plunger connection mechanism 139 for coupling to the plungers of an array of positive displacement pipettes.

In this embodiment, the pipette tip connection mechanism 119 is a pipette tip clamping mechanism 120 for connecting or coupling to and clamping the pipette tips of an array of positive displacement pipette tips during use, and the plunger connection mechanism 139 is a plunger clamping mechanism 140 for connecting or coupling to and clamping the plungers of the array of positive displacement pipettes during use. Thus, both are configured to couple to and clamp the pipette tip and the plunger, respectively. In other embodiments, the clamping features of one or other of the pipette tip connection mechanism and the plunger connection mechanism may be omitted such that the mechanism only couples to the pipette tip or to the plunger, respectively.

Mounted on the upper head chassis part 102 is a direct drive actuator 160 operable to move the plunger clamping mechanism 140 in the axial direction towards or away from the plates of the pipette tip clamping mechanism to aspirate or dispense liquid during use. The drive actuator may otherwise be an indirect drive actuator, for example comprising a motor driven belt or chain by which the plunger clamping mechanism is moved relative to the pipette tip clamping mechanism, configured to operate independently of the pipette tip clamping drive mechanism and the plunger clamping drive mechanism. Preferably, the drive actuator is a direct drive actuator. Whether the drive actuator is a direct drive actuator or an indirect drive actuator, with an independently operated drive actuator, the plunger clamping mechanism—and thus any plunger mounted thereon—can be moved relative to the pipette tip clamping mechanism to perform aspiration and dispense operations independently of the mechanisms by which the pipette tip clamps and plunger clamps are operated. For example, where the drive actuator uses a drive mechanism including one or more threaded rods, the pitch of the screw threads can be tailored specifically for the desired rate of movement of the plunger clamping mechanism rather than being determined by the operation of the plunger clamping mechanism itself. The direct drive actuator 160 is fixed in relation to the head chassis 101 and extends between the head chassis 101 and the plunger clamping mechanism 140.

The pipette tip clamping mechanism 120 comprises a pipette tip mounting plate 121, a pipette tip clamping plate 125 positioned below the pipette tip mounting plate 121 and a pipette tip clamping drive mechanism 130 operable to drive relative movement between the pipette tip mounting plate 121 and the pipette tip clamping plate 125. In this example, the pipette tip mounting plate 121 is provided as part of the lower head chassis part and the pipette tip clamping drive mechanism 130 is configured to move the pipette tip clamping plate 125 towards and away from the fixed pipette tip mounting plate 121 to selectively engage the pipette tip clamping mechanism 120.

Figure 5:
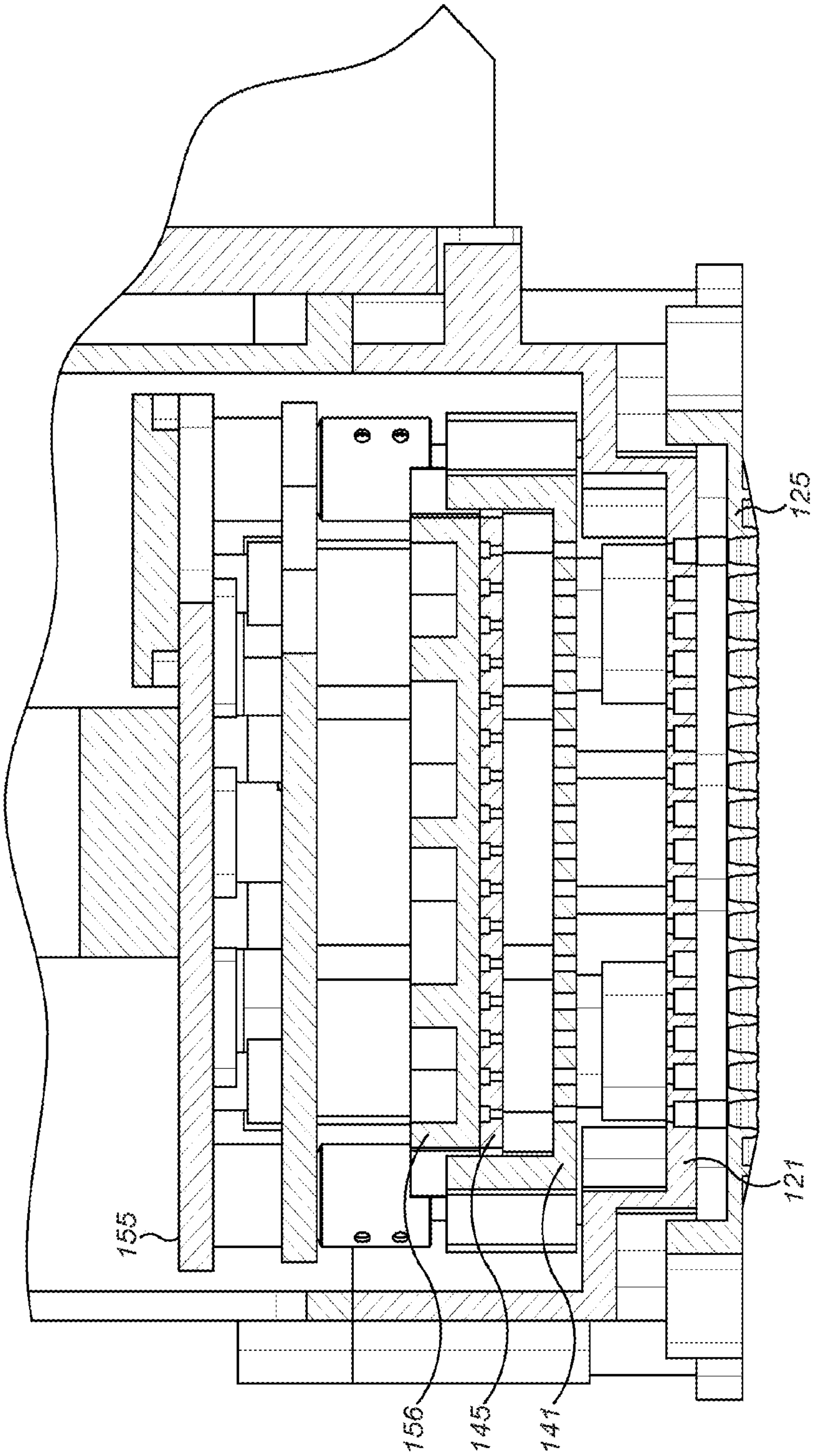
FIG. 5 is a cross-sectional view through the view of FIG. 4, in which the plates of the pipette tip clamping mechanism and the plunger clamping mechanism are shown.
Figure 6:
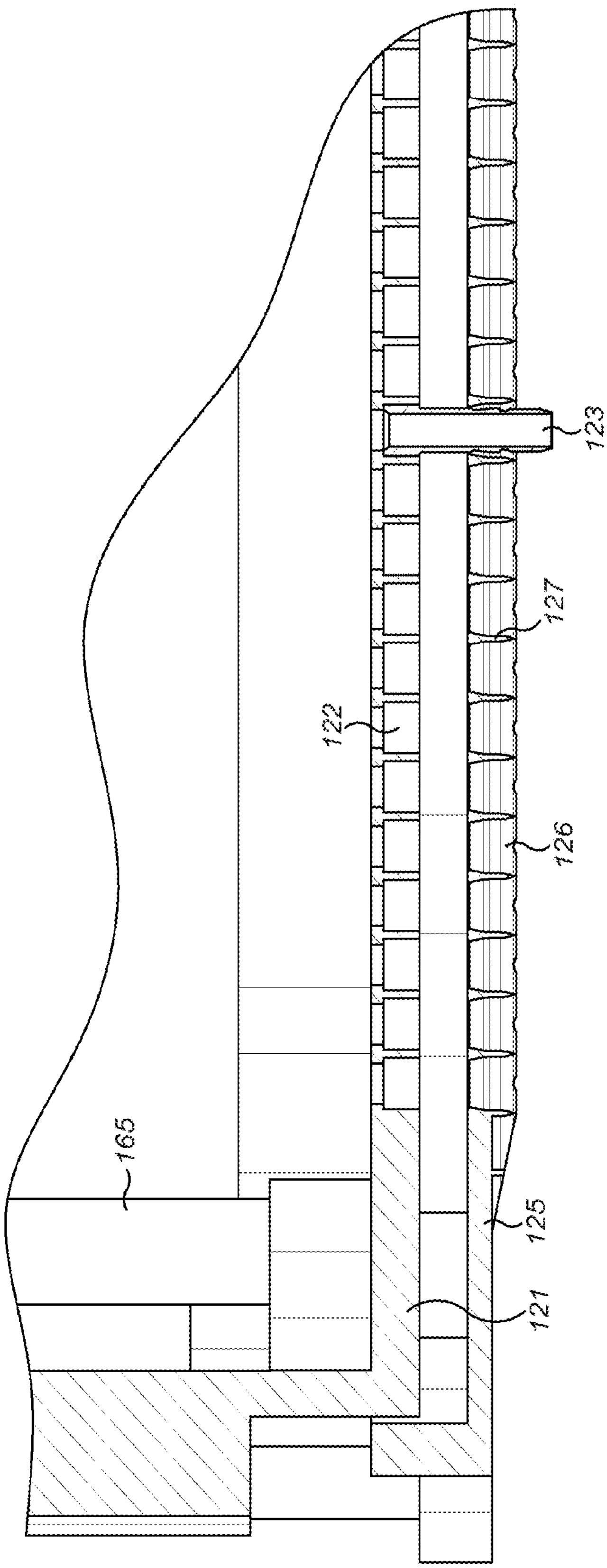
FIG. 6 is an enlarged cross-sectional perspective view through the view of FIG. 4, in which the plates of the pipette tip clamping mechanism are shown.
Figure 7:
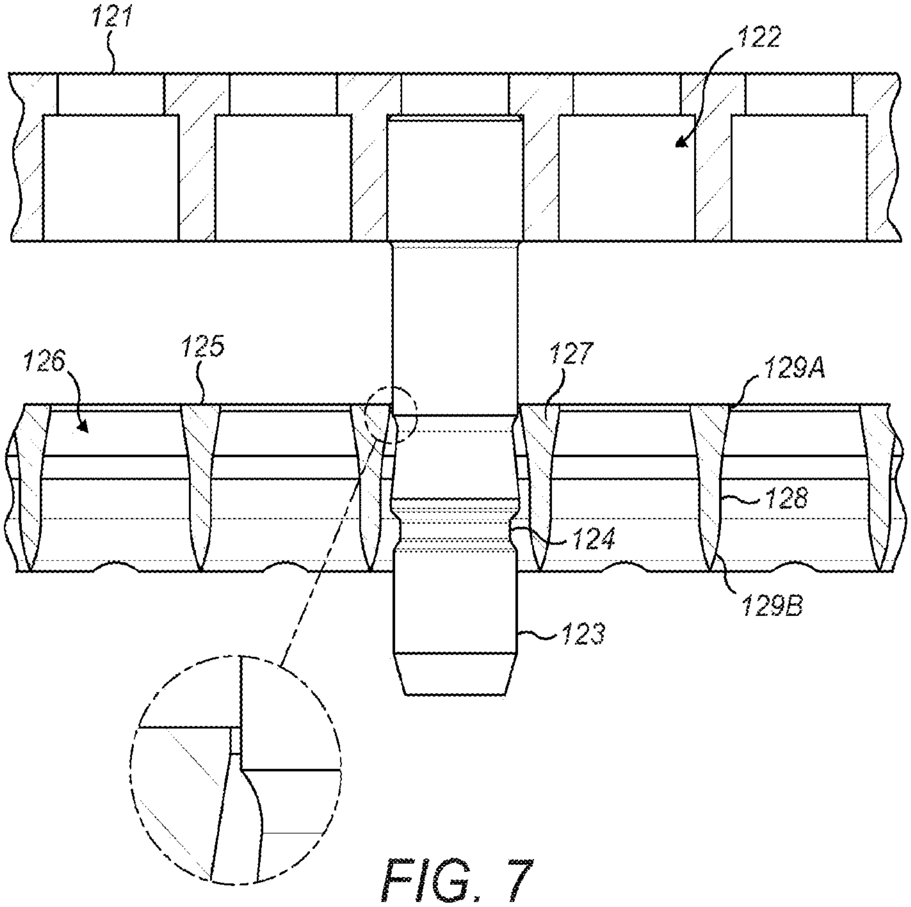
FIG. 7 is an enlarged cross-sectional view of the plates of the pipette tip clamping mechanism of the pipetting head of FIG. 2, in which a pipette tip mount sleeve is shown.

As best seen in FIGS. 5 to 7, the pipette tip mounting plate 121 has an array of apertures 122 extending in the axial direction through the thickness of the pipette tip mounting plate 121. Secured within each aperture 122 is a pipette tip mount 123 extending in a downward axial direction from the plate 121 and configured to couple with one of the pipette tips during use. Each pipette tip mount 123 is in the form of a tubular tip mount sleeve retained in one of the array of apertures 122. In this example, the apertures 122 each have a restriction with a diameter which is less than the outer diameter of the tip mounts 123. The restrictions prevent the tip mounts 123 from being forced through the tip mounting plate in an upward direction when the tip mount sleeves are initially inserted in the pipette tips. The upper end of the tip mount sleeve 123 preferably comprises an inwardly tapered end surface to assist with the insertion of components of the plunger clamping mechanism through the bore of the tip mount sleeve 123. The lower end of the tip mount 123 preferably has an outwardly tapered end surface to assist with the insertion of the lower end of the tip mount into a pipette tip. The outer surface of each tip mount 123 comprises a radially extending feature on its outer surface which is configured to form one half of a snap-fit connection with a correspondingly shaped feature on the inner surface of a pipette tip. In this example, the radially extending is in the form of an annular groove 124 which circumscribes the tip mount 123.

The pipette tip clamping plate 125 has an array of apertures 126 extending in the axial direction through the thickness of the pipette tip clamping plate 125. The array of apertures 126 correspond in number and position to the array of apertures 122 of the pipette tip mounting plate 121. The pipette tip clamping plate 125 further comprises an array of pipette tip clamping members 127 each associated with one of the plurality of pipette tip mounts 123. In this example, the array of pipette tip clamping members 127 are provided in the form of a plurality of clamp sleeves 127 defined by the regions of the pipette tip clamping plate 125 which immediately surround the apertures 126 defined in the pipette tip clamping plate 125. Each clamp sleeve 127 has a clamping region 128 with an inner diameter which is greater than the outer diameter of its respective tip mount sleeve. In this manner, a small clearance is provided between the outer surface of the tip mount sleeve 123 and the inner surface of the clamping region 128 when the pipette tip clamping mechanism is engaged, as shown in FIG. 7.

Each clamp sleeve may have a substantially constant inner diameter. Alternatively, each clamp sleeve may have regions in which the inner diameter is different, as shown in FIG. 7. In the illustrated example, each clamp sleeve 127 has a narrow region 129A towards its upper end, and a tapered region 129B at its bottom end. The inner diameter of the clamp sleeve 127 decreases in the tapered region 129B from the lowermost tip to the clamping region 128. With this arrangement, one or more pipette tips can be semi-secured by positioning in the pipette tip clamping plate 125 in an intermediate, 'pre-lock', position in which the tapered region 129B of the clamp sleeve 127 is adjacent to the recess 124 on the outer surface of the tip mount sleeve 123. This can facilitate the picking of part arrays of tips from a tip box. The picked tips can then be clamped in place by moving the pipette tip clamping plate 125 to the clamping position, once the picked tips have been raised above the unpicked array. A small clearance may be provided between the narrow region 129A of the clamp sleeve 127 and the outer surface of the tip mount 123. This can help to minimise the forces required to move the tip clamping plate 125 in the axial direction and facilitate smooth operation of the pipette tip clamping mechanism.

As best seen in FIGS. 2 to 4, the pipette tip clamping drive mechanism 130 comprises a rotary actuator 131 and a threaded shaft 132 operatively connected to an output shaft of the rotary actuator 131. The rotary actuator 131 is mounted on a tip motor support plate 135 which is fixed in relation to the pipette tip mounting plate 121. In this example, the tip motor support plate 135 is mounted on the outer surface of the lower head chassis part 103. The tip motor support plate 135 is positioned above an extension tab 133 which is fixed in relation to the pipette tip clamping plate. The extension tab 133 includes a threaded aperture 133A through which the threaded shaft 132 extends. The pipette tip clamping drive mechanism 130 further includes a plurality of guide rods 134 by which the pipette tip mounting plate 121 and the pipette tip clamping plate 125 are connected. In the illustrated embodiment, the guide rods 134 are fixed in relation to the pipette tip mounting plate 121 and each extend axially through a corresponding aperture 137 in the pipette tip clamping plate 125. Of course, it will be appreciated that the guide rods could equally be fixed in relation to the pipette tip clamping plate and extend through apertures in the pipette tip mounting plate or any other component of the pipetting head which is fixed in relation to the pipette tip mounting plate.

When the rotary actuator 131 is operated, the threaded shaft 132 rotates within the threaded aperture 133A to drive the extension tab 133 towards or away from the tip motor support plate 135, thereby causing the pipette tip clamping plate 125 in the axial direction towards or away from the pipette tip mounting plate 121. The direction of movement is dictated by the direction of rotation of the actuator 131. The guide rods 134 help to maintain a parallel relationship between the pipette tip mounting plate 121 and the pipette tip clamping plate 125 as the pipette tip clamping plate 125 moves in the axial direction towards or away from the pipette tip mounting plate 121.

As best seen in FIGS. 5 and 8 to 11, the plunger clamping mechanism 140 comprises a plunger mounting plate 141, a plunger clamping plate 145 positioned above the plunger mounting plate 141, and a plunger clamping drive mechanism 150 operable to drive relative movement between the plunger mounting plate 141 and the plunger clamping plate 145. The plunger clamping mechanism 140 further includes a plunger clamp motor mount 155 positioned above both the plunger mounting plate 141 and the plunger clamping plate 145, on which the actuator motor of the plunger clamping drive mechanism 150 is supported. The plunger mounting plate 141 and the plunger clamp motor mount 155 are fixed in relation to each other. In this example, the plunger mounting plate 141 and the plunger clamp motor mount 155 are provided as discrete components which are joined together for ease of manufacture and assembly. In other examples, the plunger mounting plate 141 and the plunger clamp motor mount 155 could be provided as a single component. The plunger clamping drive mechanism 150 is configured to move the plunger clamping plate 145 towards and away from the plunger mounting plate 141 to selectively engage the plunger clamping mechanism 140.

Figure 8:
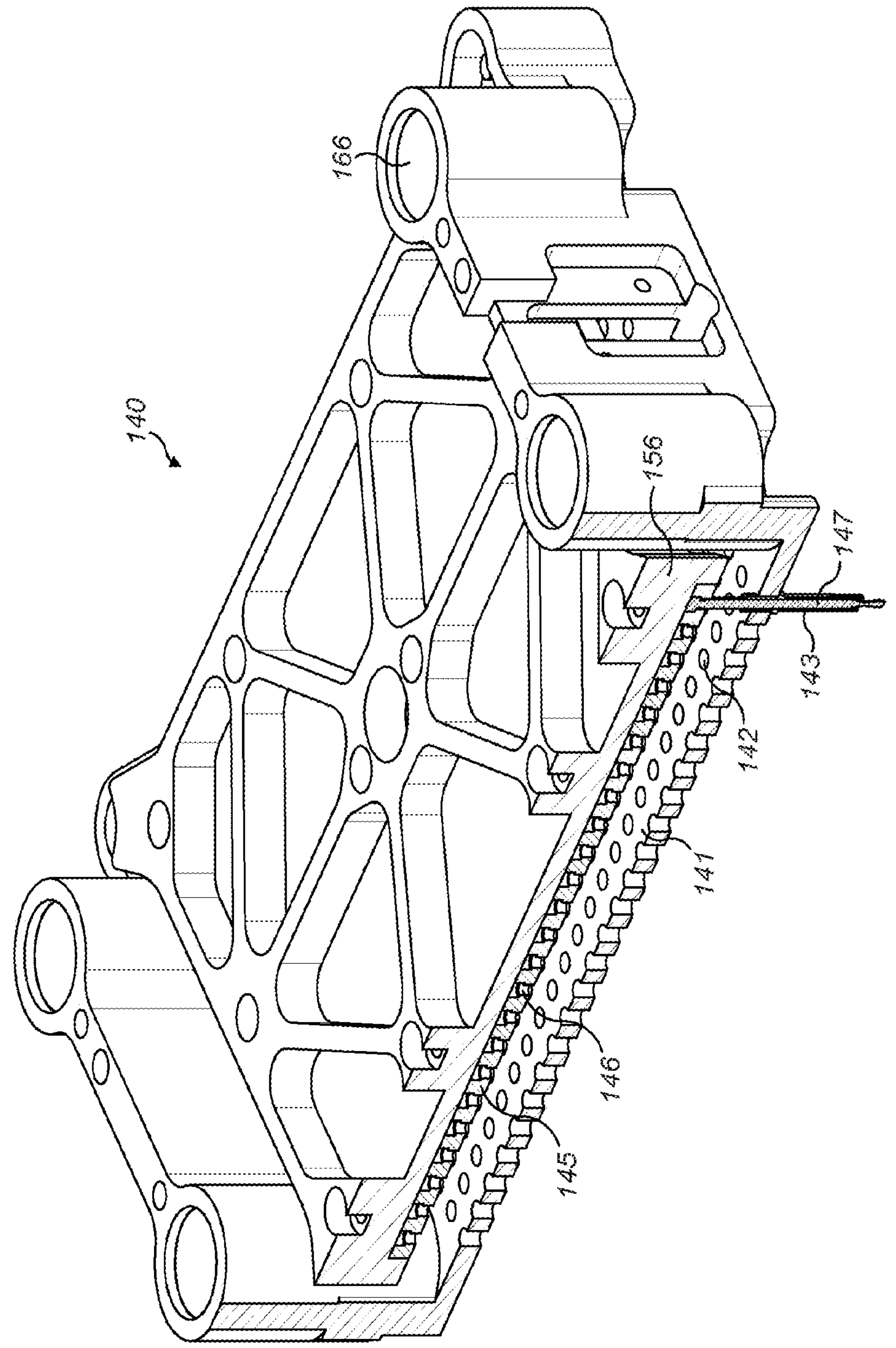
FIG. 8 is an enlarged cross-sectional perspective view of the pipetting head of FIG. 2, in which various components are omitted for clarity, and in which the plates of the plunger clamping mechanism are shown in more detail.
Figure 9:
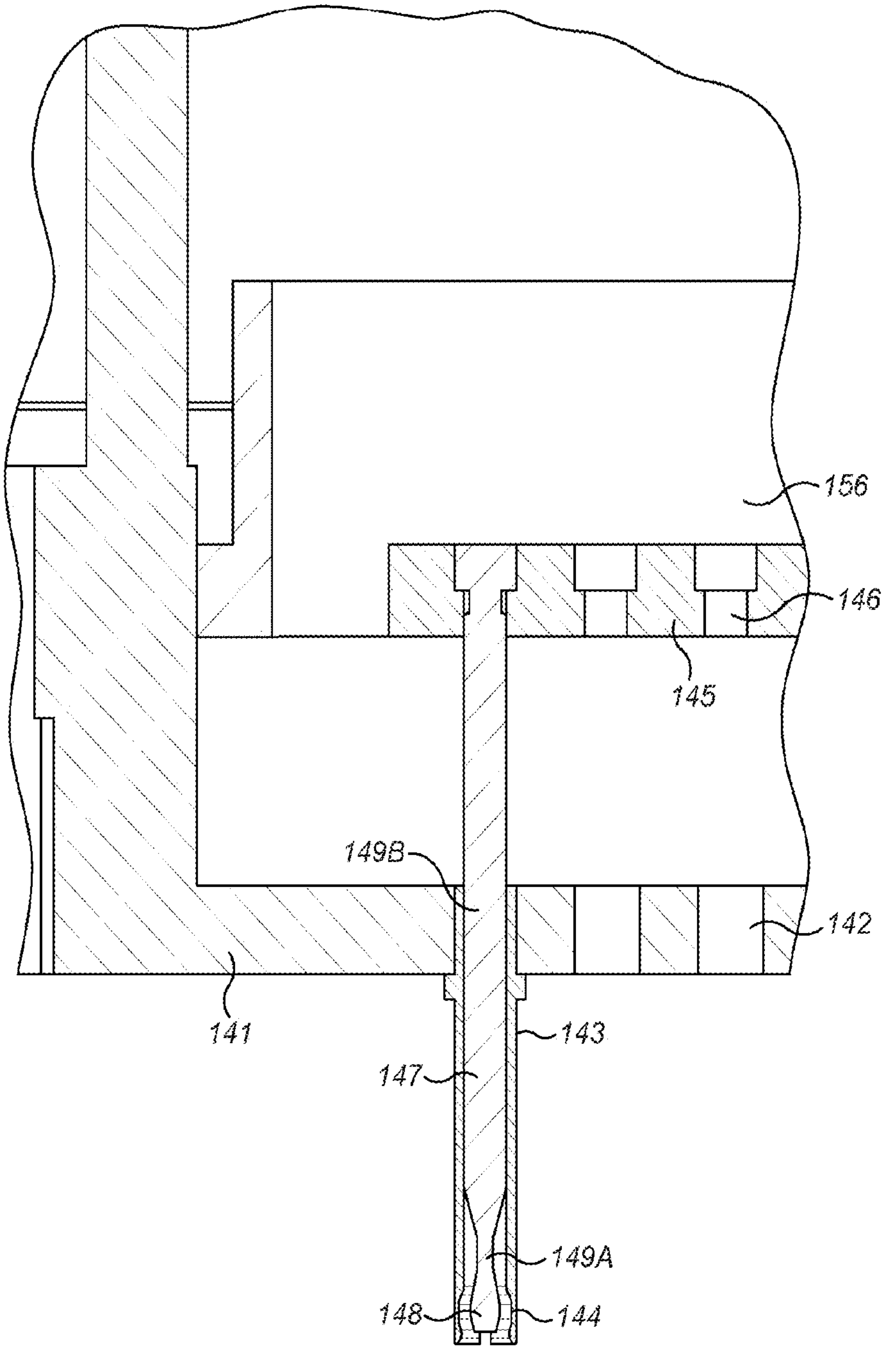
FIG. 9 is an enlarged cross-sectional view of the plates of the plunger clamping mechanism of the pipetting head of FIG. 2, in which a plunger mount and clamping member are shown.

As best seen in FIGS. 8 and 9, the plunger mounting plate 141 has an array of apertures 142 extending in the axial direction through the thickness of the plunger mounting plate 141. Secured within each aperture 142 is a plunger mount 143 extending in a downward axial direction from the plate 141 and configured to couple with one of the plungers during use. Each plunger mount 143 is in the form of a tubular plunger mount retained in one of the array of apertures 142. In this example, the plunger mounts 143 each have a shoulder having an outer diameter which is greater than the diameter of the apertures 142 and which abuts against the underside of the plunger mount plate 141. The shoulder helps to set the height of the plunger mount 143 when initially inserted into an aperture 142 in the plunger mount plate 141. The lower end of the plunger mount 143 preferably has an inwardly tapered end surface to assist with the insertion of a plunger into the bore of the plunger mount 143.

The plunger clamping plate 145 has an array of recesses or apertures 146 extending in the axial direction. The array of apertures 146 of the plunger clamping plate 145 correspond in number and position to the array of apertures 142 of the plunger mounting plate 141. The array of apertures 146 of the plunger clamping plate 145 may also correspond in number to the arrays of apertures 122 and 126 of the pipette tip clamping mechanism. The plunger clamping plate 145 further comprises an array of plunger clamping members 147 each associated with one of the plurality of plunger mounts 143. The array of plunger clamping members 147 is provided in the form of a plurality of clamping rods which extend axially from the plunger clamping plate 145 and extend into the bores defined within the plunger mount sleeves 143. Each clamping member 147 has an enlarged head 148 at its lower end which extends from a narrower neck region 149A. The enlarged head 148 has an outer diameter which is less than the inner diameter of the plunger mount 143. In this manner, a small clearance is provided between the outer surface of the enlarged head 148 and the inner surface of the plunger mount 143 when the plunger clamping mechanism is engaged. The neck 149A has an outer diameter which is less than that of the enlarged head 148. Preferably, each clamping member 147 also has a main shaft 149B with an outer diameter which is substantially the same as the inner diameter of the region of the plunger mount 143 in which it is located. The main shaft 149B moves axially along the bore of the plunger mount 143 as the plunger clamping plate 145 is moved up and down in the axial direction relative to the plunger mount plate 141.

Figure 13:
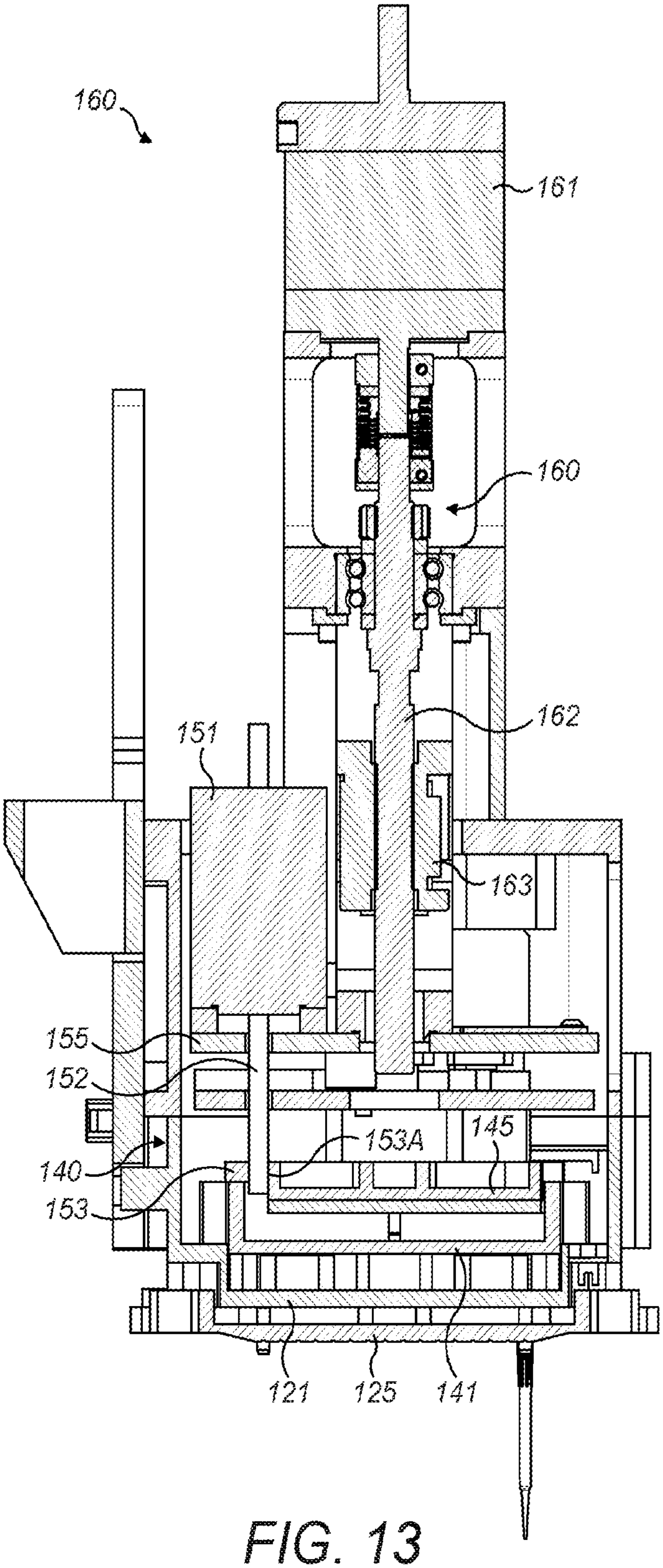
FIG. 13 is a cross-sectional side view of the pipetting head of FIG. 2.
Figure 14:
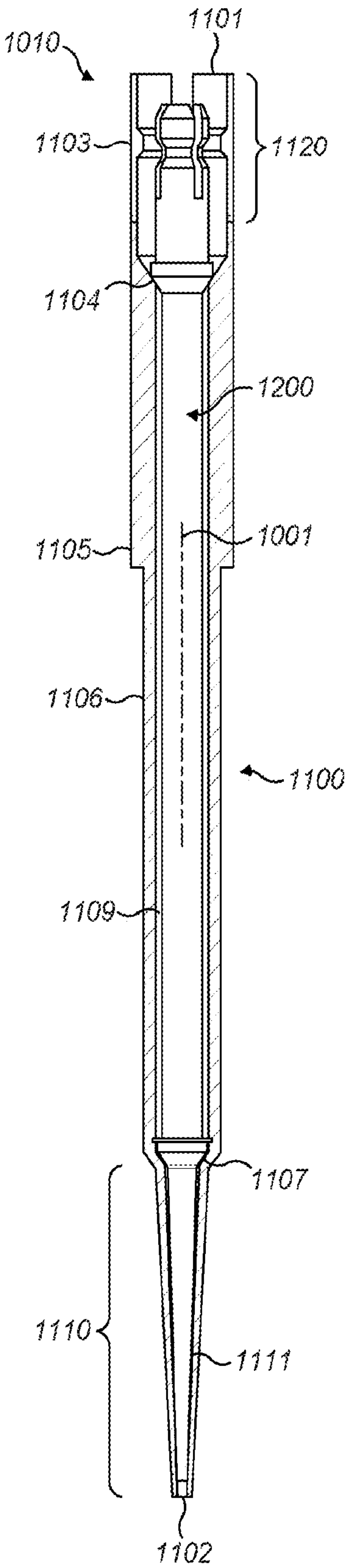
FIG. 14 is a cross-section view of a pipette for use with the liquid dispensing system of FIG. 1.

As best seen in FIG. 13, the plunger clamping drive mechanism 150 comprises a rotary actuator 151 and a threaded shaft 152 operatively connected to an output shaft of the rotary actuator 151. The rotary actuator 151 is mounted on the plunger clamp motor mount 155 and is thus fixed in relation to the plunger mounting plate 141. The rotary actuator 151 is positioned above an aperture portion 153 of the plunger clamping plate 145 having a threaded aperture 153A through which the threaded shaft 152 extends. The plunger clamping mechanism 150 further includes a plurality of guide rods 154 by which the plunger mounting plate 141 and the plunger clamping plate 145 are operatively connected. In the illustrated embodiment, the guide rods 154 are fixed in relation to the plunger clamping plate 145 and each extend axially into the bore of a corresponding cylindrical housing 157 extending from the underside of the plunger clamp motor mount 155. Of course, it will be appreciated that the guide rods could equally be fixed in relation to the plunger mounting plate 141 and extend through apertures in the plunger clamping plate 145 or any other component of the pipetting head which is fixed in relation to the plunger clamping plate 145.

Figure 10:
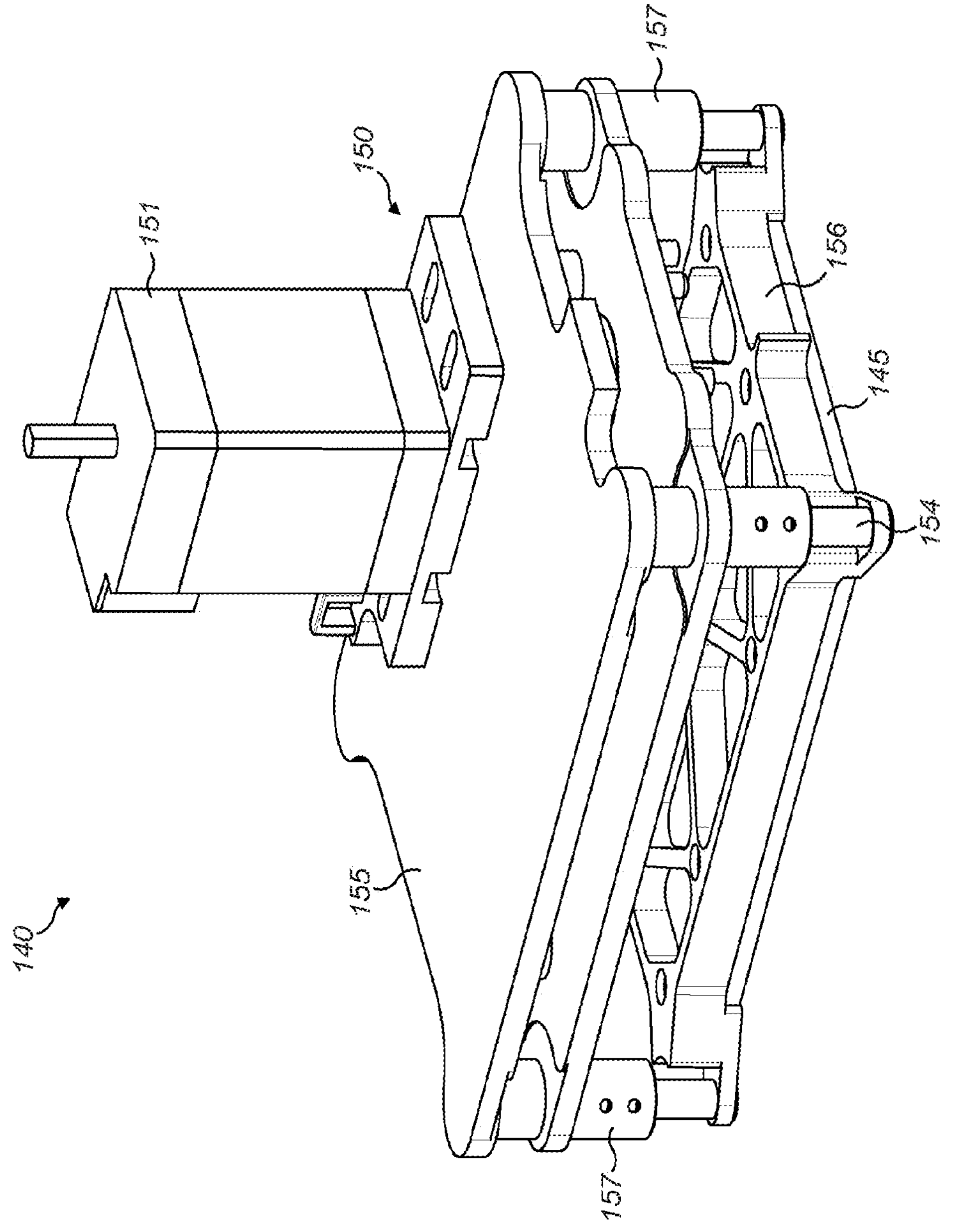
FIG. 10 is a perspective view of the plunger clamping mechanism of pipetting head of FIG. 2, in which the plunger mounting plate is omitted for clarity and in which the plunger clamping plate is shown in a clamping position.
Figure 11:
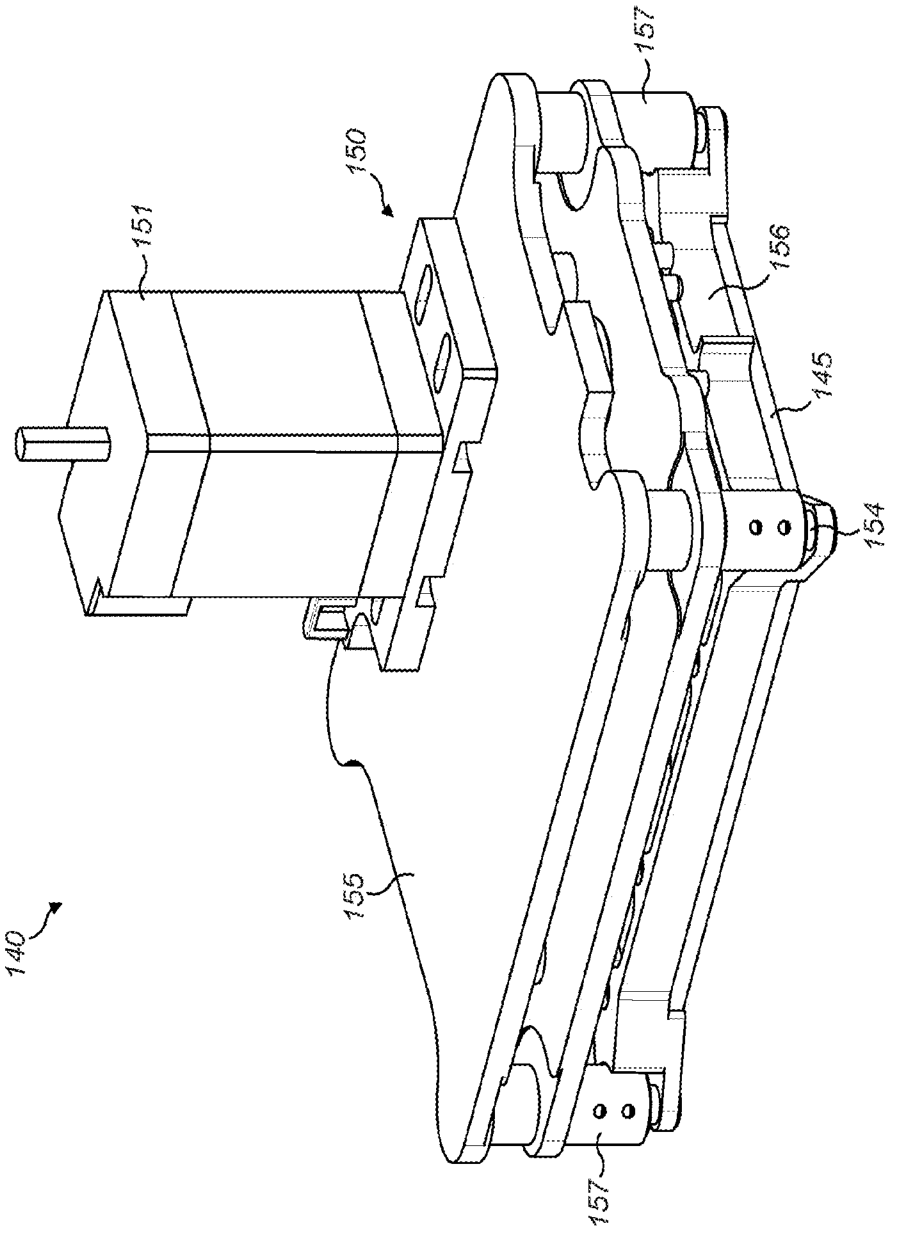
FIG. 11 is a perspective view of the plunger clamping mechanism of pipetting head of FIG. 2, in which the plunger mounting plate is omitted for clarity and in which the plunger clamping plate is shown in a release position.

When the rotary actuator 151 is operated, the threaded shaft 152 rotates within the threaded aperture 153A to drive the plunger clamping plate 145 towards or away from the plunger mounting plate 141 in the axial direction. The guide rods 154 help to maintain a parallel relationship between the plunger mounting plate 141 and the plunger clamping plate 145 as the plunger clamping plate 145 moves in the axial direction towards or away from the plunger mounting plate 141. The direction of movement is dictated by the direction of rotation of the actuator 151. This can be seen in FIGS. 10 and 11, in which the plunger mounting plate 141 is omitted for clarity. In FIG. 10, the guide rods 154 can be seen to be extended from the cylindrical housings 157, such that the plunger clamping plate 145 and its support plate 156 are in a low position away from the underside of the plunger clamp motor mount 155 and closer to the upper surface of the plunger mounting plate (not shown in FIGS. 10 and 11). This is the clamping position. In FIG. 11, the guide rods 154 are retracted into the cylindrical housings 157, so that the plunger clamping plate 145 and its support plate 156 are moved axially away from the plunger mounting plate 141 and towards the plunger clamp motor mount plate 155. This is the release position. The relative movement between the plunger clamping plate 145 and the plunger mounting plate 141 allows the plunger clamping mechanism 140 to be moved into any position between an engaged state, in which a plunger is clamped in position, and a disengaged, or "released" position or state, in which a plunger may be mated with or removed from the plunger mounts in an axial direction. The plunger clamping mechanism 140 may be configured to move to an ejection state, in which the plunger clamping plate 145 is moved towards the plunger mounting plate 141 beyond the clamping position. In this position, the enlarged heads 148 of the clamping rods 147 are axially below the radially extending features on the inner surfaces of the plunger mount sleeves 143, which are instead in alignment with the narrower neck portions 149A of the clamping rods. This allows the top of the plunger, i.e. the plunger connector portion, to flex inwards. Further downward movement of the clamping plate 145 and clamping rods 147 pushes the plunger downwards to release it from the snap-fit connection with the plunger mounting sleeves. When the pipette tip clamping plate 125 is also in a released position, further downward movement of the clamping rod using the plunger clamping drive mechanism pushes the plunger against one or more inside surfaces of the pipette tip, for example the region around the aperture at the distal end of the pipette tip, to push the pipette tip from the tip clamping mechanism. This ejects the entire pipette assembly from the pipetting head. Alternatively, the clamping rod and the plunger may be moved down together using the direct drive actuator 160 to push against the pipette and thereby eject the pipette tip from the apparatus. In this ejection mode, the plunger may remain on the apparatus even after the pipette tip has been ejected.

Figure 12:
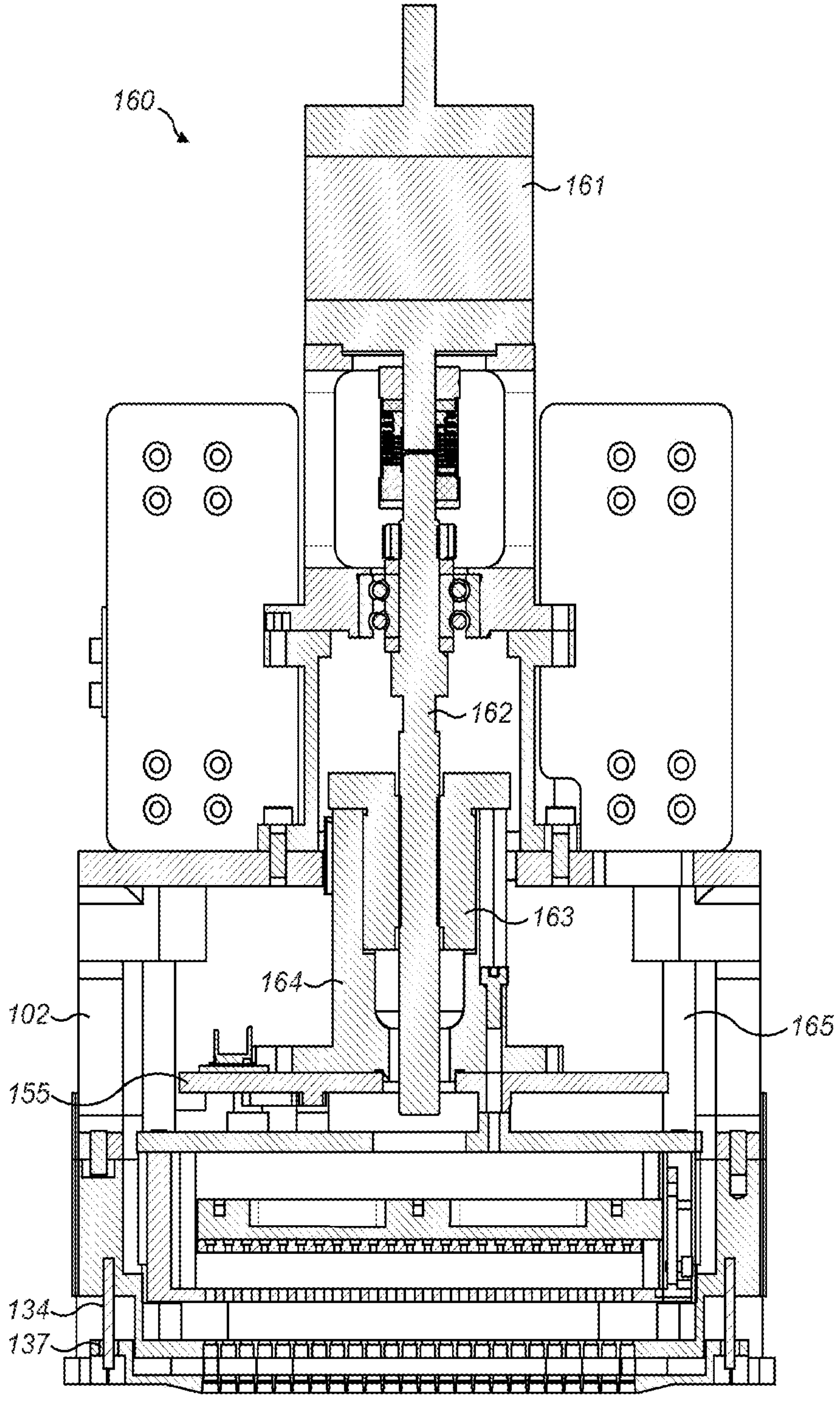
FIG. 12 is a cross-sectional front view of the pipetting head of FIG. 2.

FIGS. 12 and 13 show the direct drive actuator 160 in more detail. The direct drive actuator 160 comprises an actuator motor 161 mounted on the top surface of the upper head chassis 102. The output shaft of the actuator motor 161 is coupled to a threaded rod 162 connected to a ball screw actuator nut 163. The output shaft of the actuator 161 may be integral with or fixed to the threaded rod 162. In the illustrated embodiment, the output shaft is coupled to the threaded rod by a rotationally rigid coupling in the form of bellows coupling 161A. The bellows coupling 161A permits relative axial movement between the output shaft and the threaded shaft 162 but prevents or substantially prevents relative rotation between those two components. The nut 163 is fixed to a ball screw mount 164 so that the two move simultaneously. In the illustrated embodiment, the ball screw mount 164 is fixed to the plunger clamp motor mount 155 at the upper end of the plunger clamping mechanism 140. In other embodiments, the ball screw mount 164 may be integrated with the plunger clamp motor mount 155. The direct drive actuator 160 thus extends between the head chassis 101 and the plunger clamping mechanism 140.

When the actuator motor 161 is operated, the entire plunger clamping mechanism 140 is moved in the axial direction along guide rods 165 either towards or away from the pipette tip clamping mechanism 120, depending on the direction of rotation of the actuator motor 161. The guide rods 165 are unthreaded. The plunger mounting plate 141 includes a plurality of guide sleeves 166 (see FIG. 8) through which the guide rods 165 extend. The guide sleeves 166 slide along the outer surface of the guide rods when the actuator motor 161 is operated. In this manner, a plunger clamped by the plunger clamping mechanism 140 can be accelerated rapidly relative to the pipette tip within which it extends independently of any restriction imposed by the speed of operation of the clamping mechanism. This allows the apparatus to be used in a non-contact dispensing mode (also known as jetting—in which liquid is dispensed from the pipette at a distance from the target so that the drop separates from the tip before it contacts the target) as well as a contact dispensing mode (in which the liquid drop forms at the pipette tip and is deposited by contact with the target). When performing non-contact dispensing, a liquid sample must be travelling at a high enough velocity to detach from the tip. The distance travelled by the plunger for a dispense shot can be small, for example in the range of 1 mm or less. Consequently, high levels of acceleration/deceleration are needed in order to reach the target velocity for non-contact dispensing. The direct drive arrangement, for example via a ball screw, can offer higher levels of acceleration/deceleration of heavy loads than a belt driven system, thus enabling non-contact dispensing of low volume liquid samples. Furthermore, a direct drive arrangement can offer higher positional accuracy and repeatability than an equivalent belt drive mechanism. This can have a significant impact on dispense performance.

FIGS. 14 to 17 show a pipette 1010 for use with the pipetting head of FIGS. 2 to 13. The pipette 1010 comprises a pipette tip 1100 and a plunger 1200.

Figure 15:
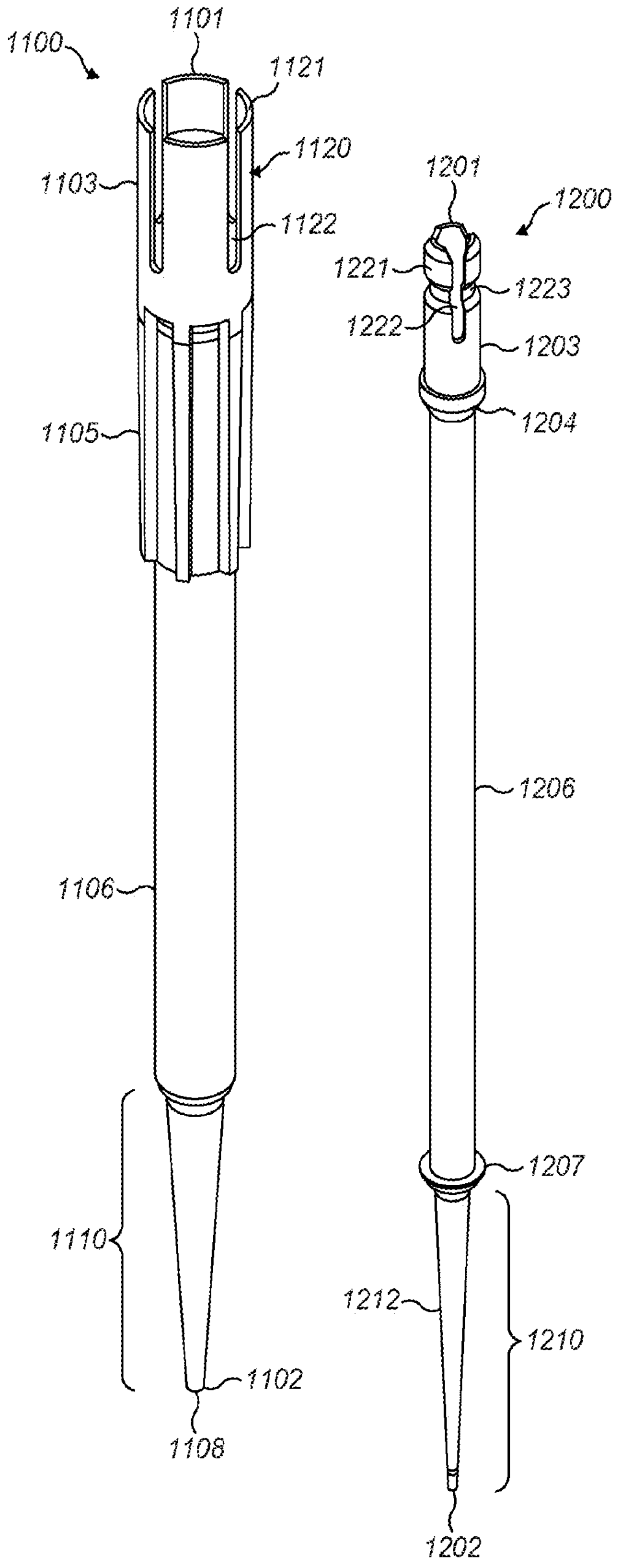
FIG. 15 is a perspective view of the pipette tip and the plunger of the pipette of FIG. 14 in which the plunger has been removed from the pipette tip.

The pipette tip 1100 may be a receptacle for receiving and/or containing a sample fluid, or a sample liquid. The pipette tip 1100 may be configured for insertion into a container of sample liquid, or into sample liquid. The pipette tip 1100 has a proximal end 1101 and a distal end 1102 defining a longitudinal axis 1001 therebetween. The pipette tip 1100 has an aperture 1108 at its distal end 1102, as indicated in FIG. 15. The aperture 1108 may be defined by an inner wall surface 1111 of the pipette tip 1100 at the distal end 1102, specifically at an outermost distal point of the pipette tip 1100. The aperture 1108 may be any suitable shape, e.g. elliptical, oval, or circular. The pipette tip 1100 has a fluid cavity 1109 extending from the aperture 1108 at least partially towards the proximal end 1101. The fluid cavity may be configured to receive and/or retain a fluid, such as an airgap or sample liquid. The fluid cavity 1109 may be substantially elongate. The fluid cavity may be defined by the inner wall surface of the pipette tip 1100. The longitudinal axis 1001 may be a central axis about which the pipette tip 1100 and/or plunger 1200 is disposed. The longitudinal axis 1001 may define a central axis about which the pipette tip 1100 and/or plunger 1200 are disposed uniformly or symmetrically. The pipette tip 1100 and/or plunger 1200 may be configured so that the direction of aspirating and/or dispensing is along the longitudinal axis 1001. The pipette tip 1100 may be substantially elongate, extending between its proximal and distal ends, 1101, 1102. The pipette tip 1100 may be substantially or entirely hollow. The pipette tip 1100 may comprise or consist of a polymeric material. The pipette tip 100 may comprise or consist of a homogeneous material. The pipette tip 100 may comprise or consist of a translucent or transparent material.

The pipette tip 1100 may comprise a series of portions, each having a different function, distinguishing features and/or a different shape or dimension. The pipette tip 1100 may comprise one or more of: a tip connector portion 1103, a centering portion 1104, a support portion 1105, a main body portion 1106, and a bridging portion 1107, for example as shown in FIG. 15. From the proximal end 1101 to the distal end 1102, each portion may be arranged in the order: tip connector portion 1103, centering portion 1104, support portion 1105, main body portion 1106, bridging portion 1107, and end portion 1110. The fluid cavity 1109 may extend through one, more or all of the portions of the pipette tip 1100. The plunger 1200 may extend through one, more or all of the portions of the pipette tip 1100. The tip connector portion 1103 is configured for connection to a liquid handling system, for example with a snap-fit connection. The tip connector portion 1103 may comprise a split tubular wall 1120 which may be defined by a plurality of flexible segments 1121. The flexible segments 1121 may be configured to resiliently deflect in a radially outward direction to increase the outer diameter of the proximal end 1101 of the pipette tip 1100 from a first outer diameter, in which the flexible segments are undeflected and the tip connector portion is in a rest state, to a second outer diameter, in which the flexible segments are deflected radially outwardly and the tip connector portion is in an expanded state. In the embodiment depicted, the tip connector portion 1103 comprises four axially extending discontinuities or slots 1122 in the tubular wall 1120 which separate four flexible segments 1121. The tip connector portion 1103 may comprise any suitable number of axially extending discontinuities 1122 to define any number of flexible segments 1121, such as two, three, four, five, or six. The arrangement of flexible segments 1121 and slots 1122 enables the tip connector portion to expand without requiring significant forces to be exerted on the tip connector portion. This can reduce the insertion force required to engage the tip connector portion 1103 with the pipetting head.

The tip connector portion 1103 may further comprise one or more radially extending features 1123 on its inner surface by which the pipette tip may be coupled to the pipetting head. The radially extending feature on the inner surface of the tip connector portion 1103 may comprise a protrusion, which extends radially inward, and/or a recess or groove, which extends radially outward. The radially extending feature may extend in a circumferential direction. In the depicted embodiment, the radially extending feature on the inner surface of the tip connector portion 1103 comprises a part-annular rib 1123 which protrudes from the inner surface of the tip connector portion 1103. Preferably, the second outer diameter to which the tip connector portion is increased is larger than the first outer diameter by at least the radial extent of the radially extending feature 1123. The rib 1123 preferably comprises angled upper and lower surfaces along which the inner diameter of tip connector portion gradually increases from the rib 1123 to the regions of the tip connector portion above and below the rib 1123. The angle of the upper surface can be selected according to the desired insertion force. The angle of the lower surface can be selected according to the desired ejection force. The upper or lower surfaces may each have an angle of from 10 to 80 degrees from the axial direction of the pipette tip, for example from 20 to 70 degrees from the axial direction of the pipette tip, 30 to 60 degrees from the axial direction of the pipette tip, or 40 to 50 degrees from the axial direction of the pipette tip.

Figure 16:
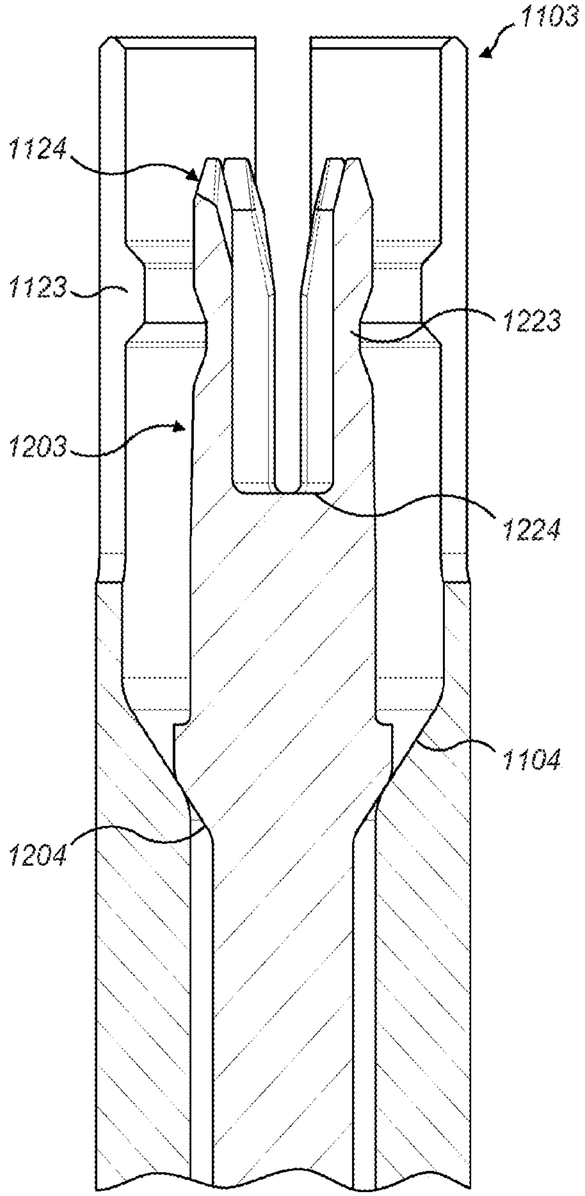
FIG. 16 is an enlarged cross-sectional view of the pipette of FIG. 14 showing the tip connector portion and the plunger connector portion in more detail.

The centering portion 1104 may be configured to centre the plunger 1200 within the pipette tip 1100. The centering portion 1104 may have an inner surface which may have a tapered or conical shape. The support portion 1105 may comprise one or more structural ribs or rings, configured to reduce flexibility and/or improve structural integrity of the pipette tip 1100. The one or more ribs may extend on an outer surface of the pipette tip, along at least part of the length between the proximal end 1101 and distal end 1102, for example axially, as best seen in FIG. 16. The main body portion 1106 may be substantially cylindrical and/or elongate. The main body portion 1106 may have a substantially uniform inner diameter and/or outer diameter. The main body portion 1106 may extend along at least half of the length of the pipette tip 1100. The main body portion 1106 may have a larger inner and/or outer diameter than any diameter of the end portion 1110. The bridging portion 1107 may be configured to bridge the main body portion 1106 to the end portion 1110. The bridging portion 1107 may define a gradual transition or a step between the main body portion 1106 and the end portion 1110.

The bridging portion 1107 may be substantially tapered, conical and/or dome-shaped.

The plunger 1200 has a proximal end 1201 and a distal end 1202 extending along the longitudinal axis 1101. The plunger 1200 is configured to extend at least partly between the proximal and distal ends 1101, 1102 of the pipette tip 1100 into the end portion 1110. The plunger 1200 may be configured to extend substantially or wholly between the proximal and distal ends 1101, 1102 of the pipette tip 1100 into the end portion 1110. The plunger 1200 is movable towards and away from the aperture 1108 to aspirate or dispense fluid from the pipette tip 1100. The plunger 1200 may have an end portion outer wall surface 1212 configured for alignment with the inner wall surface 1111 of the pipette tip end portion 1110. The plunger 1200 may comprise or consist of a polymeric material. The plunger 1200 may comprise or consist of a homogeneous material.

The plunger 1200 may comprise a series of portions, each having a different function, distinguishing features and/or a different shape or dimensions. The plunger 1200 may comprise one or more of: a plunger connector portion 1203, a centering portion 1204, a main body portion 1206, and a sealing portion 1207. From the proximal end 1201 to the distal end 1202, each portion may be arranged in the following order: connector portion 1203, centering portion 1204, main body portion 1206, sealing portion 1207 and end portion 1210.

The plunger connector portion 1203 is configured for connection to a liquid handling system, for example with a snap-fit connection. The plunger connector portion 1203 may be configured to be received entirely within the tip connector portion 1103 of the pipette tip 100. The plunger connector portion 1203 may comprise a split tubular wall 1220 which may be defined by a plurality of flexible segments 1221. The flexible segments 1221 may be configured to resiliently deflect in a radially inward direction to decrease the inner diameter of the proximal end 1201 of the plunger 1200 from a first inner diameter, in which the flexible segments are un-deflected and the plunger connector portion is in a rest state, to a second inner diameter, in which the flexible segments are deflected radially inwardly and the plunger connector portion is in a compressed state. In the embodiment depicted, the plunger connector portion 1203 comprises three axially extending discontinuities or slots 1222 in the tubular wall 1220 which separate three flexible segments 1221. The plunger connector portion 1203 may comprise any suitable number of axially extending discontinuities 1222 to define any number of flexible segments 1221. The arrangement of flexible segments 1221 and slots 1222 enables the plunger connector portion to be compressed without significant compressive stresses. The plunger connector portion 1203 may further comprise one or more radially extending features 1223 on its outer surface by which the plunger may be coupled to the pipetting head. The radially extending feature on the outer surface of the plunger connector portion 1203 may comprise a protrusion, which extends radially outward, and/or a recess or groove, which extends radially inward. The radially extending feature may extend in a circumferential direction. In the depicted embodiment, the radially extending feature on the outer surface of the plunger connector portion 1203 comprises a shaped head 1223 at the upper end of the plunger, the lower portion of which is defined by an annular groove in the outer surface of the plunger connector portion 1203. Preferably, the second inner diameter to which the plunger connector portion is decreased is smaller than the first inner diameter by at least the radial extent of the radially extending feature 1223, i.e. by at least half the difference between the outer diameter of the shaped head 1223 and the outer diameter at the narrowest part of the annular recess.

Figure 17:
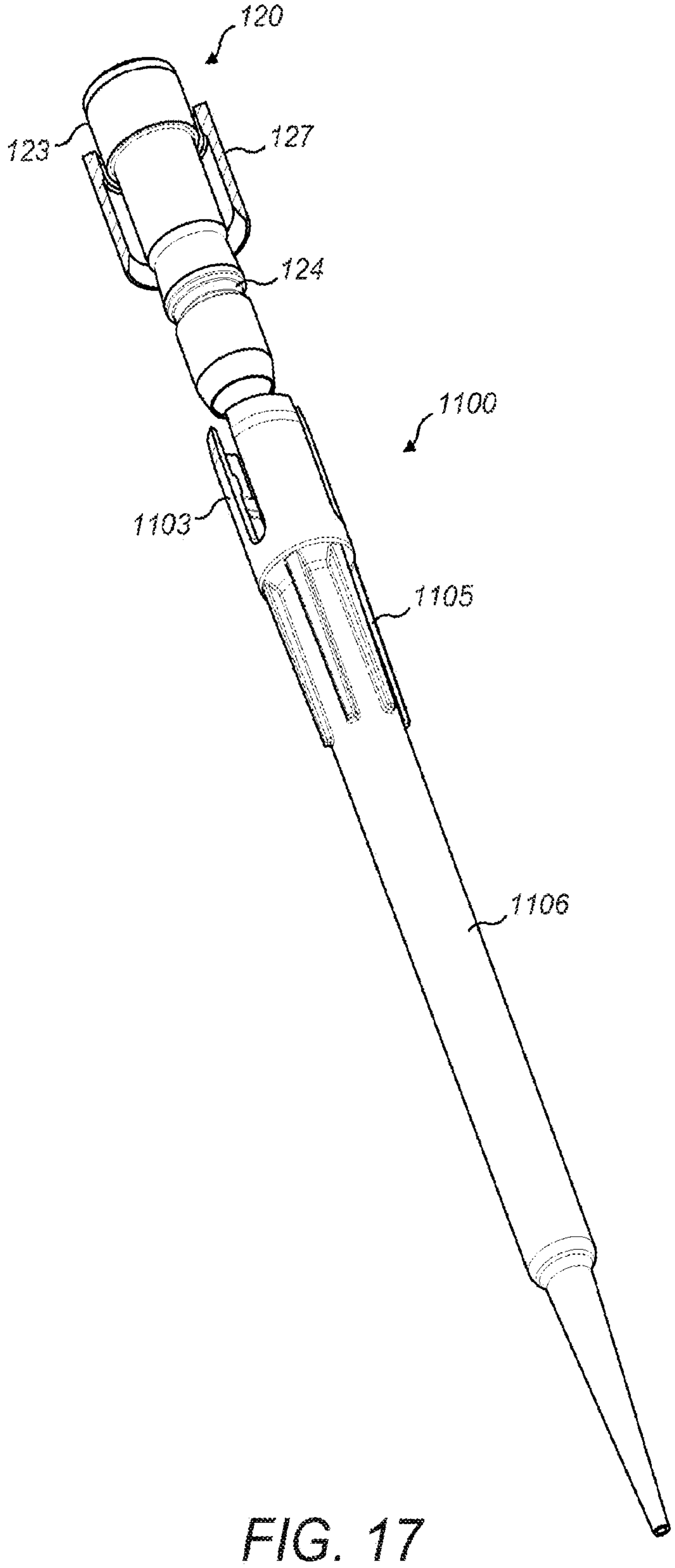
FIG. 17 is a perspective view of the pipette of FIG. 14, showing a tip mount and associated tip clamp of the pipette tip clamping mechanism.

The plunger connector portion 1203 may further comprise an internal wall 1224 extending transversely from the inner surface of the plunger connector portion 1203. The internal wall 1224 may be positioned distally of the flexible segments 1221. The internal wall 1224 may be positioned proximally of the main body portion 1206. The internal wall 1224 forms a restriction across the bore of the plunger connector portion. This provides a surface against which the head of the clamping rods can abut to eject the pipettes. The internal wall 1224 may extend across the full width of the interior bore of the plunger 1200, as illustrated in FIG. 17. However, this is not necessarily the case. The inner wall 1224 need only restrict the size of the bore to less than the outer diameter of the head of the clamping rod.

The centering portion 1204 may comprise an annular shoulder. The centering portion 1204 may be substantially conical or dome-shaped. In the depicted embodiment, the centering portion 1204 is a radially extending frustoconical shoulder. The centering portion 1104 of the pipette tip 1100 is preferably configured to receive and engage with the centering portion 1204 of the plunger 1200 to centre the alignment of the plunger. In the embodiment depicted in FIG. 14, the two centering portions have corresponding geometries. The main body portion 1206 of the plunger 1200 may be configured to be received in the main body portion 1106 of the pipette tip 1100. The main body portion 1206 may be substantially cylindrical and/or elongate. The main body portion 1206 may have a substantially uniform diameter. The main body portion 1206 may extend along at least half of the length of the plunger, optionally at least two thirds of the length of the plunger 1200. The main body portion 1206 may have a larger diameter than the diameter of the end portion 1210. The sealing portion 1207 of the plunger 1200 may be configured to be received in the bridging portion 1107 of the pipette tip 1100. The sealing portion 1207 may be configured to form a seal against an inner wall of the pipette tip 1100. The sealing portion 1207 may form a fluid-tight seal within the pipette tip, such that fluid cannot pass from a proximal side of the sealing portion 1207 to a distal side of the sealing portion 1207 when the plunger 1200 is installed in the pipette tip 1100. The sealing portion 1207 may be at least partly flexible. The sealing portion 1207 may be configured to bridge the main body portion 1206 to the end portion 1210. The sealing portion 1207 may define a step between the main body portion 1207 and the end portion 1210. The sealing portion 1207 may be substantially tapered, conical and/or dome-shaped. The end portion 1210 of the plunger 1200 may be configured to be received in the end portion 1110 of the pipette tip 1100. The end portion 1210 may have a smaller diameter than the sealing portion 1207 and/or the main body portion 1206.

With reference to FIGS. 18 to 22, a method of connecting a pipette 1010 to the pipetting head 100 of the present invention will now be described. Although the Figures to which the below discussion relates show only a single pipette, it will be understood that one or more of the connecting, aspirating, dispensing and ejecting operations discussed may be applicable to multiple pipettes simultaneously. For example, where the pipetting head comprises 384 mounts, the below discussion may apply to the simultaneous connection of 384 pipettes, or any subset thereof.

Figure 18:
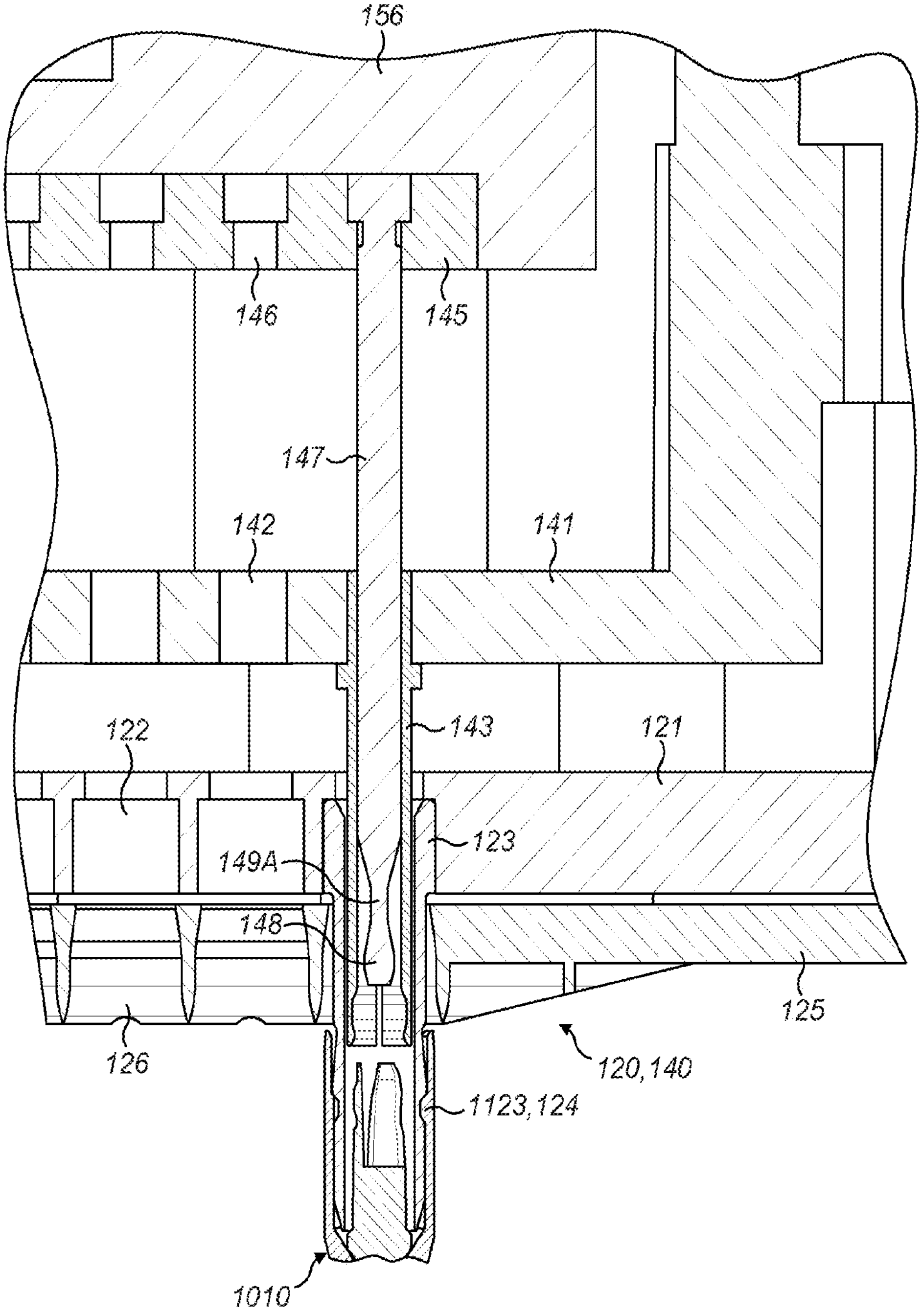
FIGS. 18 to 22 are enlarged cross-sectional views of part of the pipette tip clamping mechanism and the plunger clamping mechanism during various stages of pipette connection.

In FIG. 18, the pipette tip clamping mechanism 120 and the plunger clamping mechanism 140 are both in their released states. When the pipette tip clamping mechanism 120 is in the released state, the pipette tip clamping plate 125 is in its uppermost position against the underside of the pipette tip mounting plate 121. Crucially, in this position, the clamping regions of the tip clamp sleeves are axially offset from the annular grooves around the outer surfaces of the tip mount sleeves. When the plunger clamping mechanism 140 is in its released state, the plunger clamping plate 145 is in its uppermost position and the enlarged heads 148 of the plunger clamping rods 147 are axially offset from the annular recess on the inner surface of each of the plunger mount sleeves, as shown. The entire pipetting head 100 is then moved using the pipette head Z motor (not shown) axially towards an array of pipettes 1010 such that the tip mount sleeves are received within the tip connector portions of the pipette tips 1100. During insertion of the tip mount sleeves 123 into the proximal ends of the pipette tips 1100, the annular ribs 1123 on each pipette tip 1100 ride over the outer surface of the tip mount sleeve 123, causing the tip connector portion of each tip to be outwardly deflected to the expanded position. Once the annular rib 1123 is received in the annular groove 124, as shown in FIG. 18, the flexible segments return to an un-deflected, or only partially deflected state. In this position, the tip connector portion is in a rest state and each pipette tip 1100 is coupled to its respective pipette tip mount sleeve 123 in a snap fit connection. This is step 1.

Figure 19:
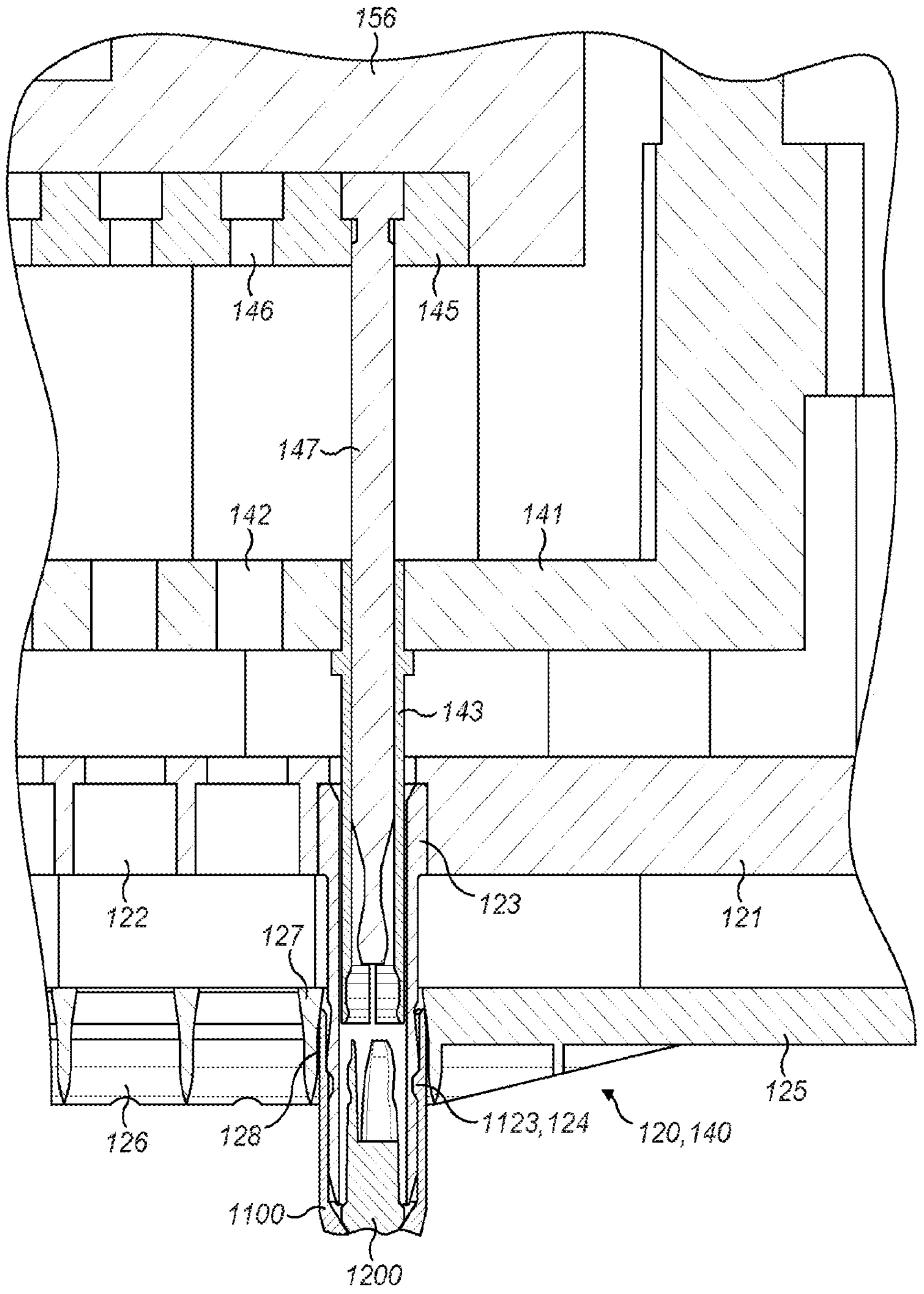

Step 2 is discussed with reference to FIG. 19. In step 2, the pipette tip clamping mechanism 120 is engaged by lowering the pipette tip clamping plate 125 and moving it away from the pipette tip mounting plate, as shown in FIG. 19. This causes the tip clamping sleeves 127 to extend around the tip connector portion 1103 of each pipette tip 1100 such that the clamping region of each tip clamping sleeve is adjacent to the snap fit connection between each pipette tip 1100 and its respective tip mount sleeve 123. The inner diameter of the clamping region 128 is less than the expanded diameter of the tip connector portion 1103, for example it may be substantially the same as the unexpanded, or "first", outer diameter of the tip connector portion. With this arrangement, the tip connector portion 1103 is prevented from expanding fully, thus preventing the radially extending feature 1123 on the inner surface of the pipette tip 1100 from being released from the groove 124 on the outer surface of the tip mount sleeve 123. In this manner, the pipette tip 1100 is "locked" or "clamped" in position without the need to exert any significant forces on the tip connector portion of the pipette tip 1100. This can reduce the force required to engage the pipette tip clamping mechanism.

Between steps 1 and 2, the pipette tip clamping mechanism may optionally be moved to a partially engaged, 'pre-lock', position between the released and engaged states, in which the tapered region 129B of each clamp sleeve 127 is adjacent to the recess 124 on the outer surface of its respective tip mount sleeve 123. This can facilitate the picking of part arrays of tips from a tip box by allowing picked tips to be secured against the tip mounts without interference between the pipette tip clamping plate and the unpicked array of tips. Once the picked tips have been raised above the unpicked array by the pipetting head, the picked tips can then be fully clamped in place by moving the pipette tip clamping plate 125 to the clamping position.

Figure 20:
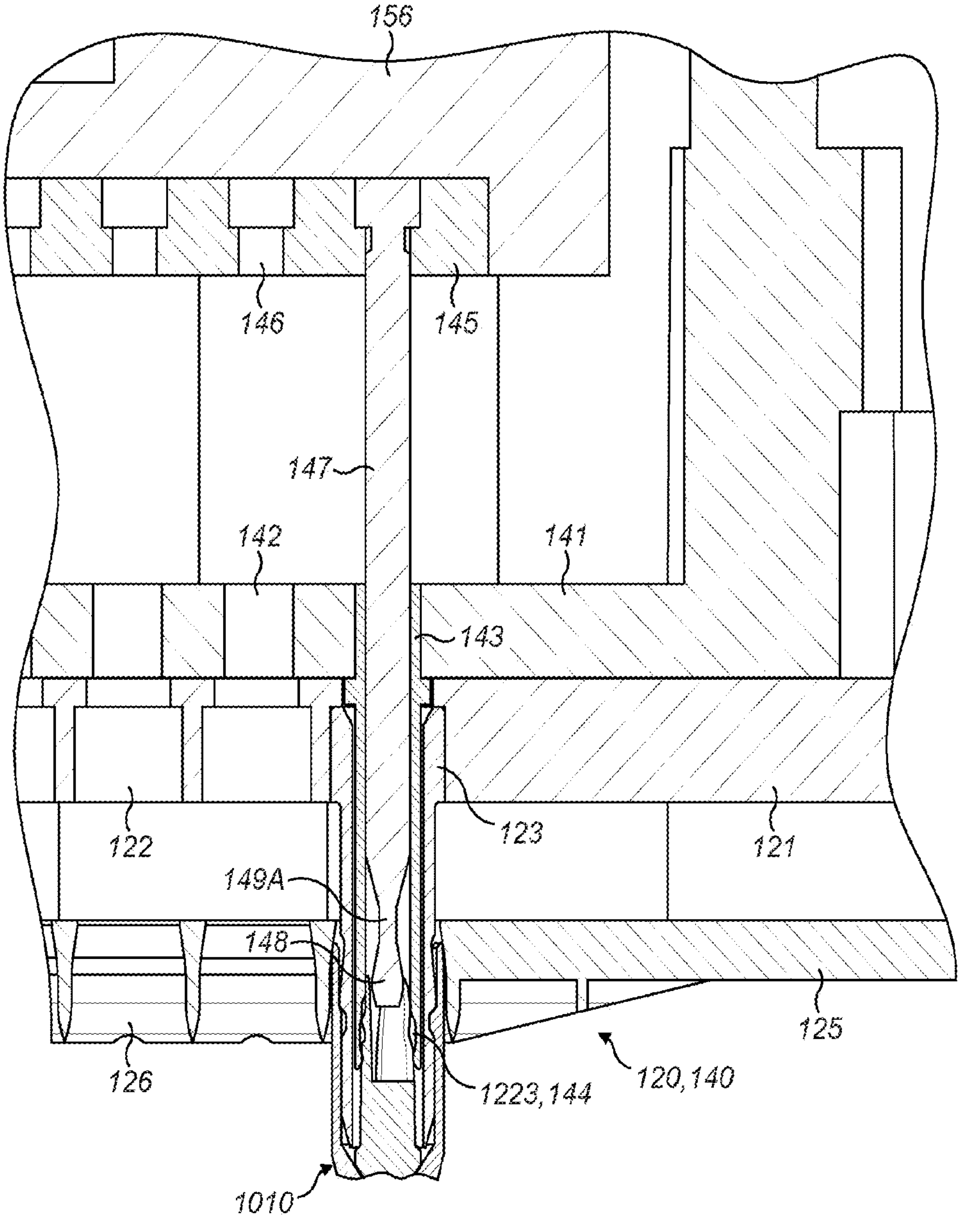

Step 3 is discussed with reference to FIG. 20. In step 3, the entire plunger clamping mechanism 140 is lowered using the direct drive actuator. This brings the plunger mount sleeves 143 into contact with the plunger connector portion 1203 at the upper, or proximal, ends of the plunger 1200. Further downward movement of the plunger clamping mechanism 140 causes the inner surface of the plunger mount sleeve 143 to ride over the outer surface of the plunger connector portion, inwardly deflecting the plunger connector portion to the contracted or compressed position and allowing the shaped head 1223 at the top of the plunger 1200 to be received in the recess 144 on the inside surface of the plunger mount sleeve 143. Once the shaped head 1223 is received in the recess 144 on the inside surface of the plunger mount sleeve 143, as shown in FIG. 20, the flexible segments 1221 of the plunger connector portion 1203 return to an undeflected, or partially deflected state. In this position, the plunger connector portion is in a rest state and each plunger 1200 is coupled to its respective plunger mount sleeve 143 in a snap fit connection.

Figure 21:
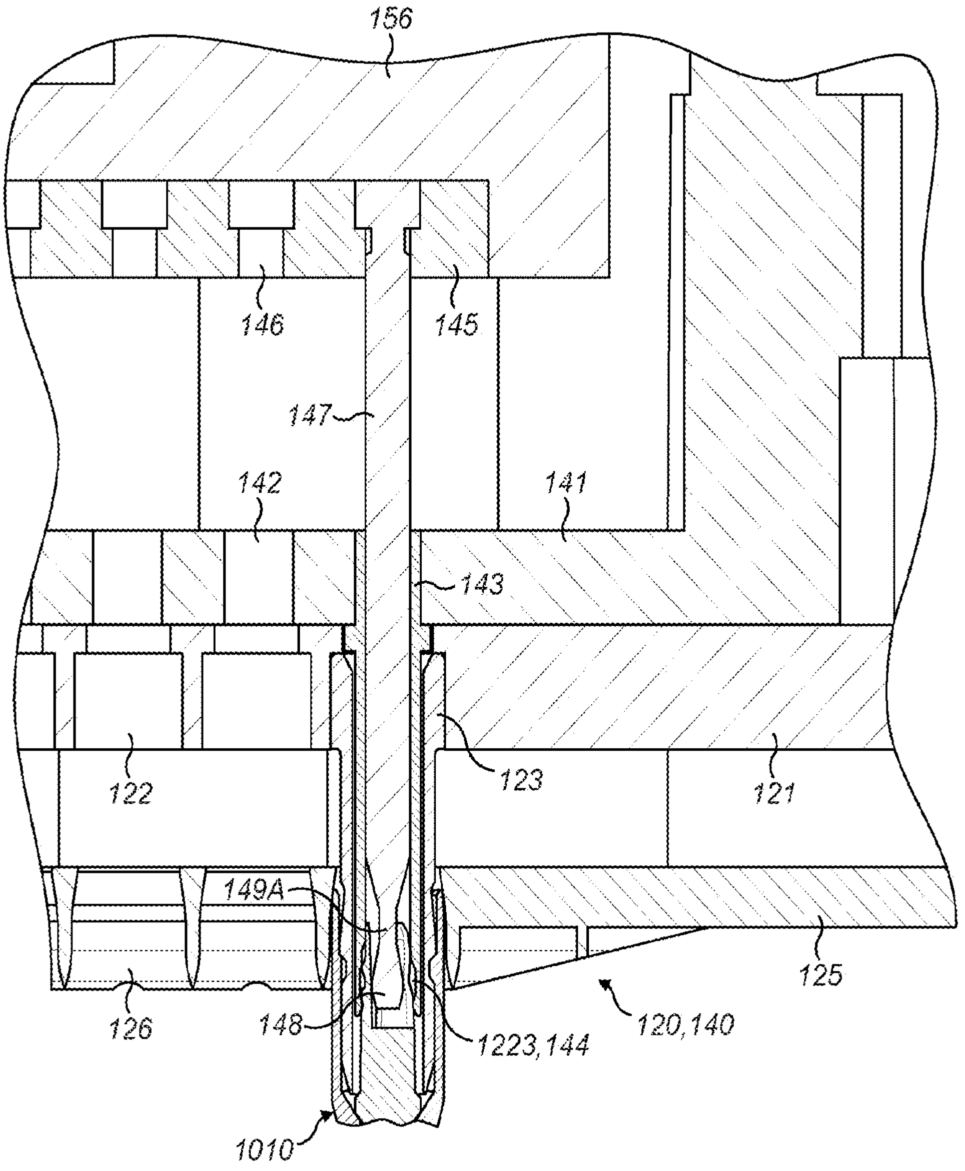

Step 4 is discussed with reference to FIG. 21. In step 4, the plunger clamping plate 145 is moved in the axial direction towards the plunger mounting plate 141 by the plunger clamp drive mechanism until the heads 148 of the plunger clamp rods are adjacent to the snap fit connection between the plunger and the plunger mount sleeve. The outer diameter of the head 148 of each clamping rod is greater than the inner diameter of the plunger when in the contracted state, or "second inner diameter". For example it may be substantially the same as the inner diameter of the un-deflected plunger, or "first" inner diameter. With this arrangement, the plunger connector portion is prevented from contracting fully to the contracted position, thus preventing the shaped head 1223 of the plunger 1200 from being released from the recess 144 on the inner surface of the plunger mount sleeve 143. In this manner, the plunger 1200 is "locked" or "clamped" in position without the need to exert any significant compressive forces on the plunger connector portion. This can reduce the force required to engage the plunger clamping mechanism.

Figure 22:
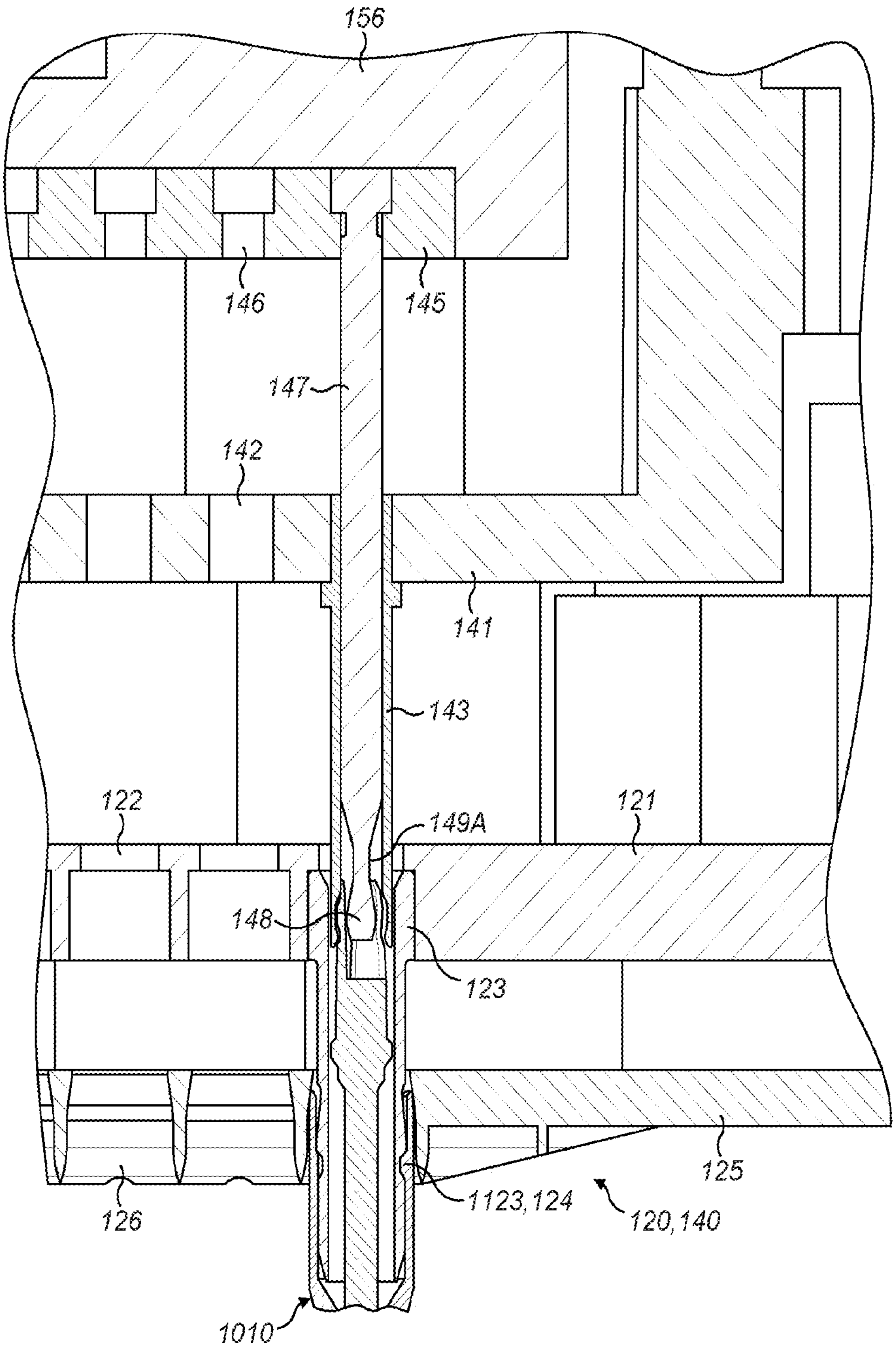

To perform an aspirating operation, the pipetting head 100 is moved to the desired position relative to a set of liquid samples using the pipetting head Z motor. The plunger of each pipette is then raised within its respective pipette tip using the direct drive actuator to move the entire plunger clamping mechanism away from the pipette tip clamping mechanism, as shown in FIG. 22, to draw fluid into the pipette tip. The fluid can then be dispensed as desired by moving the plunger clamping mechanism in the opposite direction using the direct drive actuator.

Once the aspirating and dispensing operations are complete, the pipette or pipettes can be ejected as follows. Firstly, the plungers are each moved to the bottom of their travel inside their respective pipette tip and the tip clamping mechanism 120 is disengaged by moving the tip clamping plate 125 towards the tip mounting plate 121 to bring the clamp sleeves 127 out of alignment with the snap-fit connection between each pipette tip and its respective tip mount 123, and away from the outer surfaces of the pipette tips. Next the plunger clamping plate 145 is moved towards the plunger mounting plate 141, beyond the engaged position, such that the head 148 of each clamping rod 147 is moved out of alignment with the snap-fit connection between each plunger 1200 and its respective plunger mount 143 and instead bringing the neck portion 149A of each clamping rod 147 into alignment with the snap-fit connection and causing the distal end surface of the head of the clamping rod to abut against the internal wall 1224 of the plunger connector portion 1203. Since the neck portions 149A of the clamping rods 147 have an outer diameter which is less than the second, compressed, inner diameter of the plunger connector portions 1203, when the clamping rods are in this position, the plunger connector portions are not restricted from deflecting inwardly to the compressed state. Thus, continued downward movement of the plunger clamping plate 145 releases the shaped heads 1223 of the plunger connector portions 1203 from the corresponding radially extending features 144 of the plunger mounts 143 to remove the plungers 1200 from the pipetting head. Further downward movement of the plunger clamping plate, and therefore of the clamping rods and the plungers themselves, pushes the distal end portions of the plungers against the respective portions of the pipette tips within which they are located. In this manner, the plungers and the plunger clamping mechanism can be used to release the pipette tips 1100 from the pipette tip mounts 123, thereby ejecting the pipettes 1010 from the pipetting head.

Although the invention has been described above with reference to one or more preferred embodiments, it will be appreciated that various changes or modifications may be made without departing from the scope of the invention as defined in the appended claims.

The present invention may also be described or defined in accordance with the following clauses:

1. A pipetting head for a liquid dispensing apparatus for use with an array of pipettes each having a pipette tip and a plunger disposed within the pipette tip, the pipetting head comprising:

a pipette tip connection mechanism with a plurality of tip mounts for holding the pipette tips of the array of pipettes during use; and a plunger connection mechanism with a plurality of plunger mounts for holding the plungers of the array of pipettes during use, wherein:

(i) each of the plurality of tip mounts comprises a radially extending feature on its outer surface which is configured to form one half of a snap-fit connection, and wherein the pipette tip connection mechanism is a pipette tip clamping mechanism further comprising:

a plurality of tip clamping members each associated with one of the plurality of tip mounts and each having a clamping region, and a tip clamping drive mechanism comprising an actuator operable to drive relative movement between the tip mounts and the tip clamping members in an axial direction to selectively engage the pipette tip clamping mechanism by moving it between a clamp position and a release position, wherein the clamping region of each tip clamping member is axially adjacent to the radially extending feature on the outer surface of its associated tip mount when the pipette tip clamping mechanism is in the clamp position, and wherein the clamping region of each tip clamping member is axially offset from the radially extending feature on the outer surface of its associated tip mount when the pipette tip clamping mechanism is in the release position; and/or (ii) each of the plurality of plunger mounts has a radially extending feature on its inner surface which is configured to form one half of a snap-fit connection, and wherein the plunger connection mechanism is a plunger clamping mechanism further comprising:

a plurality of plunger clamping members each associated with one of the plurality of plunger mounts and each having a clamping region, and a plunger clamping drive mechanism comprising an actuator operable to drive relative movement between the plunger mounts and the plunger clamping members in an axial direction to selectively engage the plunger clamping mechanism by moving it between a clamp position and a release position, wherein the clamping region of each plunger clamping member is axially adjacent to the radially extending feature on the inner surface of its associated plunger mount when the plunger clamping mechanism is in the clamp position, and wherein the clamping region of each plunger clamping member is axially offset from the radially extending feature on the inner surface of its associated plunger mount when the plunger clamping mechanism is in the release position.

2. The pipetting head of clause 1, wherein the plurality of tip clamping members comprises a plurality of sleeves which define the clamping region, are coaxial with the plurality of tip mounts and circumscribe the plurality of tip mounts when the pipette tip clamping mechanism is in the clamp position.

3. The pipetting head of clause 2, wherein the pipette tip clamping mechanism comprises a pipette tip clamping plate on which the plurality of tip clamping members is provided, the pipette tip clamping plate being moveable in the axial direction relative to the plurality of pipette tip mounts to selectively engage the pipette tip clamping mechanism.

4. The pipetting head of clause 3, wherein the plurality of sleeves are defined by apertures defined in the pipette tip clamping plate.

5. The pipetting head of any of clause 1 to 4, wherein the radially extending feature on the outer surface of each of the plurality of tip mounts is a circumferential groove.

6. The pipetting head of any of clause 1 to 5, wherein the plurality of plunger mounts comprises a plurality of axially extending sleeves and wherein the plurality of plunger clamping members comprises a plurality of axially extending clamping rods which define the clamping region and extend inside the plurality of axially extending sleeves when the plunger clamping mechanism is engaged.

7. The pipetting head of clause 6, wherein the plurality of clamping rods each have an enlarged distal end portion connected to a narrower shaft portion, the enlarged distal end portion defining the clamping region.

8. A pipette for use with the pipetting head of any of clause 1 to 7, comprising:

a pipette tip having a distal end with a dispensing aperture and a proximal end with a tip connector portion for connecting the pipette tip to the pipette tip connection mechanism of the pipetting head during use; and a plunger having a distal end positioned inside the pipette tip and a proximal end with a hollow plunger connector portion for connecting the plunger to the plunger connection mechanism of the pipetting head during use, wherein (i) the tip connector portion has a radially extending feature on its inner surface configured to form a snap-fit connection with the radially extending feature on the outer surface of one of the plurality of pipette tip mounts, the tip connector portion being configured to resiliently deflect in a radially outward direction from a rest position, in which the tip connector portion has a first outer diameter, to an expanded position, in which the tip connector portion has a second outer diameter which is larger than the first outer diameter by at least the radial extent of the radially extending feature of the tip connector portion; and/or (ii) wherein the plunger connector portion has a radially extending feature on its outer surface configured to form a snap-fit connection with the radially extending feature on the inner surface of one of the plurality of plunger mounts, the plunger connector portion being configured to resiliently deflect in a radially inward direction from a rest position, in which the plunger connector portion has a first inner diameter, to a compressed position, in which the plunger connector portion has a second inner diameter which is smaller than the first inner diameter by at least the radial extent of the radially extending feature of the plunger connector portion.

9. The pipette of clause 8, wherein the tip connector portion comprises a split tubular wall defined by a plurality of flexible segments configured to resiliently deflect in the radially outward direction to deflect the tip connector portion from the rest position to the expanded position.

10. The pipette of clause 8 or clause 9, wherein the radially extending feature on the inner surface of the tip connector portion comprises a circumferential rib which protrudes radially inwardly from the inner surface of the tip connector portion.

11. The pipette of any of clauses 8 to 10, wherein the plunger connector portion comprises a split tubular wall defined by a plurality of flexible segments configured to resiliently deflect in a radially inward direction to deflect the plunger connector portion from the rest position to the compressed position.

12. The pipette of any of clauses 8 to 11, wherein the radially extending feature on the outer surface of the plunger connector portion comprises a shaped head portion directly adjacent to a circumferential groove which extends radially outwardly into the inner surface of the plunger connector portion.

13. The pipetting head of any of clauses 2 to 4, further comprising at least one pipette according to any of claims 8 to 12, wherein the clamping region of each of the plurality of sleeves of the tip clamping mechanism has an inner diameter which is greater than or equal to the first outer diameter of the tip connector portion and is less than the second outer diameter of the tip connector portion such that the clamping region prevents the tip connector portion from deflecting to the expanded position and thereby releasing the snap-fit connection when the tip clamping mechanism is in the clamp position.

14. The pipetting head of clause 6 or clause 7, further comprising at least one pipette according to any one of claims 8 to 12, wherein the clamping region of each of the plurality of axially extending clamping rods has an outer diameter which is less than or equal to the first inner diameter of the plunger connector portion and is greater than the second inner diameter of the plunger connector portion such that the clamping region prevents the plunger connector portion from deflecting to the compressed position and thereby releasing the snap-fit connection when the plunger clamping mechanism is in the clamp position.

15. A liquid dispensing apparatus comprising:
- a body with a microplate receiving area; and
- a pipetting head according to any of clauses 1 to 7, 13 or 14, the pipetting head being positioned above the microplate receiving area.

What is claimed is:

1. A pipetting head for a liquid dispensing apparatus for use with an array of pipettes each having a pipette tip and a plunger disposed within the pipette tip, the pipetting head comprising:
- a pipette tip connection mechanism with a plurality of tip mounts for holding the pipette tips of the array of pipettes during use; and
- a plunger connection mechanism with a plurality of plunger mounts for holding the plungers of the array of pipettes during use,
- wherein:
- each of the plurality of plunger mounts has a radially extending feature on its inner surface which is configured to form one half of a snap-fit connection, and wherein the plunger connection mechanism is a plunger clamping mechanism further comprising:
  - a plurality of plunger clamping members each associated with one of the plurality of plunger mounts and each having a clamping region, and
  - a plunger clamping drive mechanism comprising an actuator operable to drive relative movement between the plunger mounts and the plunger clamping members in an axial direction to selectively engage the plunger clamping mechanism by moving it between a clamp position and a release position,
- wherein the plurality of plunger mounts comprises a plurality of axially extending sleeves and wherein the plurality of plunger clamping members comprises a plurality of axially extending clamping rods which define the clamping region and extend inside the plurality of axially extending sleeves when the plunger clamping mechanism is engaged, such that the clamping region of each plunger clamping rod is axially adjacent to the radially extending feature on the inner surface of its associated plunger mount when the plunger clamping mechanism is in the clamp position, and the clamping region of each plunger clamping rod is axially offset from the radially extending feature on the inner surface of its associated plunger mount when the plunger clamping mechanism is in the release position, and wherein a radial clearance is provided between the plurality of clamping rods and the plurality of plunger mounts when the plunger clamping mechanism is in the clamp position.

2. The pipetting head of claim 1, wherein the plurality of clamping rods each have an enlarged distal end portion connected to a narrower shaft portion, the enlarged distal end portion defining the clamping region.

3. The pipetting head of claim 1, wherein each of the plurality of tip mounts comprises a radially extending feature on its outer surface which is configured to form one half of a snap-fit connection, and wherein the pipette tip connection mechanism is a pipette tip clamping mechanism further comprising:
- a plurality of tip clamping members each associated with one of the plurality of tip mounts and each having a clamping region, and
- a tip clamping drive mechanism comprising an actuator operable to drive relative movement between the tip mounts and the tip clamping members in an axial direction to selectively engage the pipette tip clamping mechanism by moving it between a clamp position and a release position,
- wherein the clamping region of each tip clamping member is axially adjacent to the radially extending feature on the outer surface of its associated tip mount when the pipette tip clamping mechanism is in the clamp position, and wherein the clamping region of each tip clamping member is axially offset from the radially extending feature on the outer surface of its associated tip mount when the pipette tip clamping mechanism is in the release position.

4. The pipetting head of claim 3, wherein the plurality of tip clamping members comprises a plurality of sleeves which define the clamping region, are coaxial with the plurality of tip mounts and circumscribe the plurality of tip mounts when the pipette tip clamping mechanism is in the clamp position.

5. The pipetting head of claim 4, wherein the pipette tip clamping mechanism comprises a pipette tip clamping plate on which the plurality of tip clamping members is provided, the pipette tip clamping plate being moveable in the axial direction relative to the plurality of pipette tip mounts to selectively engage the pipette tip clamping mechanism.

6. The pipetting head of claim 5, wherein the plurality of sleeves are defined by apertures defined in the pipette tip clamping plate.

7. The pipetting head of claim 3, wherein the radially extending feature on the outer surface of each of the plurality of tip mounts is a circumferential groove.

8. A pipette for use with the pipetting head of claim 1, comprising:

a pipette tip having a distal end with a dispensing aperture and a proximal end with a tip connector portion for connecting the pipette tip to the pipette tip connection mechanism of the pipetting head during use; and a plunger having a distal end positioned inside the pipette tip and a proximal end with a hollow plunger connector portion for connecting the plunger to the plunger connection mechanism of the pipetting head during use, wherein the plunger connector portion has a radially extending feature on its outer surface configured to form one half of a snap-fit connection, the plunger connector portion being configured to resiliently deflect in a radially inward direction from a rest position, in which the plunger connector portion has a first inner diameter, to a compressed position, in which the plunger connector portion has a second inner diameter which is smaller than the first inner diameter by at least the radial extent of the radially extending feature of the plunger connector portion.

9. The pipette of claim 8, wherein the tip connector portion comprises a split tubular wall defined by a plurality of flexible segments configured to resiliently deflect in the radially outward direction to deflect the tip connector portion from the rest position to the expanded position.

10. The pipette of claim 8, wherein the radially extending feature on the inner surface of the tip connector portion extends in a circumferential direction.

11. The pipette of claim 10, wherein the radially extending feature on the inner surface of the tip connector portion comprises a circumferential rib which protrudes radially inwardly from the inner surface of the tip connector portion.

12. The pipette of claim 8, wherein the plunger connector portion comprises a split tubular wall defined by a plurality of flexible segments configured to resiliently deflect in a radially inward direction to deflect the plunger connector portion from the rest position to the compressed position.

13. The pipette of claim 8, wherein the radially extending feature on the outer surface of the plunger connector portion extends in a circumferential direction.

14. The pipetting head of claim 1, further comprising at least one pipette according to claim 13, wherein the clamping region of each of the plurality of axially extending clamping rods has an outer diameter which is less than or equal to the first inner diameter of the plunger connector portion and is greater than the second inner diameter of the plunger connector portion such that the clamping region prevents the plunger connector portion from deflecting to the compressed position and thereby releasing the snap-fit connection when the plunger clamping mechanism is in the clamp position.

15. A pipetting head for a liquid dispensing apparatus for use with an array of pipettes each having a pipette tip and a plunger disposed within the pipette tip, the pipetting head comprising:

a plunger connection mechanism with a plurality of plunger mounts for holding the plungers of the array of pipettes during use, and a pipette tip connection mechanism with a plurality of tip mounts for holding the pipette tips of the array of pipettes during use, wherein each of the plurality of tip mounts comprises a radially extending feature on its outer surface which is configured to form one half of a snap-fit connection, and wherein the pipette tip connection mechanism is a pipette tip clamping mechanism further comprising:

a plurality of tip clamping members each associated with one of the plurality of tip mounts and each having a clamping region, and a tip clamping drive mechanism comprising an actuator operable to drive relative movement between the tip mounts and the tip clamping members in an axial direction to selectively engage the pipette tip clamping mechanism by moving it between a clamp position and a release position, wherein the plurality of tip clamping members comprises a plurality of sleeves which define the clamping region and which are coaxial with the plurality of tip mounts such that the plurality of sleeves circumscribe the plurality of tip mounts with the clamping region of each of the plurality of sleeves being axially adjacent to the radially extending feature on the outer surface of its associated tip mount when the pipette tip clamping mechanism is in the clamp position, and wherein the clamping region of each sleeve is axially offset from the radially extending feature on the outer surface of its associated tip mount when the pipette tip clamping mechanism is in the release position, and wherein a radial clearance is provided between the plurality of sleeves and the plurality of tip mounts when the pipette tip clamping mechanism is in the clamp position.

16. The pipetting head of claim 15, wherein the plurality of tip clamping members comprises a plurality of sleeves which define the clamping region, are coaxial with the plurality of tip mounts and circumscribe the plurality of tip mounts when the pipette tip clamping mechanism is in the clamp position.

17. The pipetting head of claim 16, wherein the pipette tip clamping mechanism comprises a pipette tip clamping plate on which the plurality of tip clamping members is provided, the pipette tip clamping plate being moveable in the axial direction relative to the plurality of pipette tip mounts to selectively engage the pipette tip clamping mechanism.

18. The pipetting head of claim 17, wherein the plurality of sleeves are defined by apertures defined in the pipette tip clamping plate.

19. The pipetting head of any of claim 15, wherein the radially extending feature on the outer surface of each of the plurality of tip mounts is a circumferential groove.

20. The pipette of 13, wherein the radially extending feature on the outer surface of the plunger connector portion comprises a shaped head portion directly adjacent to a circumferential groove which extends radially outwardly into the inner surface of the plunger connector portion.

* * * * *